(12) United States Patent
Yu et al.

(10) Patent No.: US 12,375,698 B2
(45) Date of Patent: Jul. 29, 2025

(54) DISTRIBUTED COMPUTATIONAL SYSTEM AND METHOD FOR ARTIFICIAL NEURAL NETWORK

(71) Applicant: DEEPX CO., LTD., Seongnam-si (KR)

(72) Inventors: Ha Joon Yu, Gimpo-si (KR); Lok Won Kim, Yongin-si (KR); Jung Boo Park, Seoul (KR); You Jun Kim, Suwon-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/504,522

(22) Filed: Nov. 8, 2023

(65) Prior Publication Data

US 2024/0089475 A1    Mar. 14, 2024

Related U.S. Application Data

(63) Continuation of application No. PCT/KR2023/012754, filed on Aug. 29, 2023.

(30) Foreign Application Priority Data

Aug. 29, 2022 (KR) .................. 10-2022-0108446
Dec. 14, 2022 (KR) .................. 10-2022-0175322

(51) Int. Cl.
*H04N 19/42* (2014.01)

(52) U.S. Cl.
CPC .................. *H04N 19/42* (2014.11)

(58) Field of Classification Search
CPC .................................... H04N 19/42
See application file for complete search history.

(56) References Cited

U.S. PATENT DOCUMENTS

| | | | |
|---|---|---|---|
| 2021/0265018 A1* | 8/2021 | Dutta | G06N 3/048 |
| 2022/0210435 A1* | 6/2022 | Kang | H04N 19/196 |
| 2023/0090616 A1* | 3/2023 | Nitta | G06N 3/0464 706/12 |
| 2023/0156413 A1* | 5/2023 | Verhulst | H04R 25/606 381/314 |
| 2023/0232026 A1* | 7/2023 | Kim | G06N 3/045 |
| 2023/0262483 A1* | 8/2023 | Yerramalli | G06N 3/084 370/328 |
| 2023/0274137 A1* | 8/2023 | Makariou | G06N 5/045 706/25 |
| 2023/0298219 A1* | 9/2023 | Galpin | H04N 19/61 382/232 |
| 2023/0353764 A1* | 11/2023 | Ikonin | G06N 3/045 |
| 2023/0421764 A1* | 12/2023 | Ahn | G06V 10/7715 |
| 2024/0056575 A1* | 2/2024 | Ahn | H04N 19/184 |

FOREIGN PATENT DOCUMENTS

| | | | | |
|---|---|---|---|---|
| EP | 3635953 B1 * | 10/2023 | .......... | G06F 18/213 |
| WO | 2021201642 A1 | 10/2021 | | |
| WO | 2022139616 A1 | 6/2022 | | |

\* cited by examiner

*Primary Examiner* — Tracy Y. Li
(74) *Attorney, Agent, or Firm* — Bridgeway IP Law Group, PLLC; Jihun Kim

(57) ABSTRACT

According to an example of the present disclosure, a neural processing unit (NPU) capable of encoding is provided. The NPU comprises one or more processing elements (PEs) which perform operations for a plurality of layers of an artificial neural network and generate a plurality of output feature maps. The NPU also comprises an encoder which encodes at least one particular output feature map among a plurality of output feature maps into a bitstream and then transmits thereof.

20 Claims, 31 Drawing Sheets

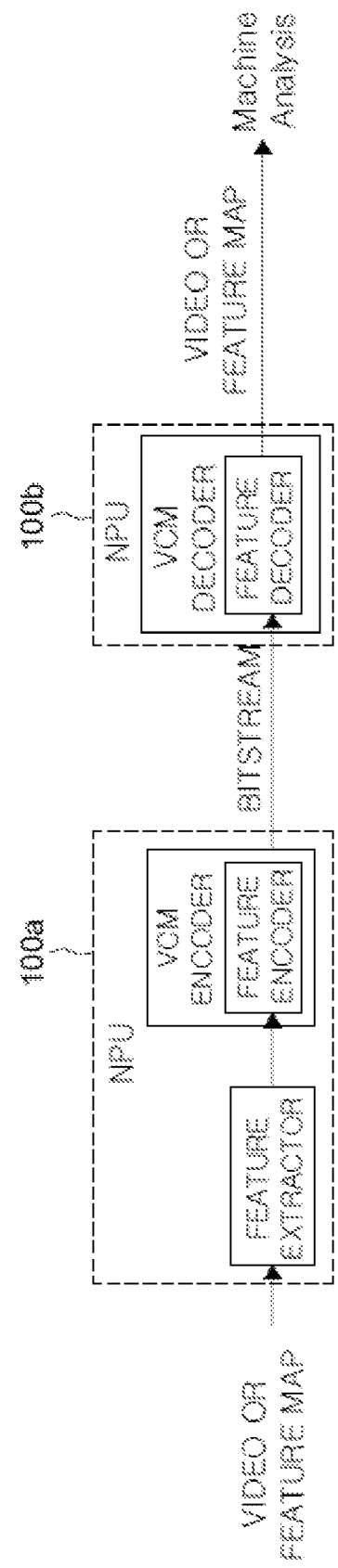

FIG. 13B

| Layer name | Input feature map | | | | Kernel | | | | Output feature map | | | | Algorithm | | | 연산량 | Data size (Byte) | | |
|---|---|---|---|---|---|---|---|---|---|---|---|---|---|---|---|---|---|---|---|
| | Height | Width | Ch # | | Height | Width | # | | Height | Width | Ch # | Strides | AVG_pooling | Activation | | MAC | Kernel_SIZE | IFMAP_SIZE | OFMAP_SIZE |
| 1 | 224 | 224 | 3 | | 3 | 3 | 32 | | 112 | 112 | 32 | 2 | NO | RELU | | 10,838,016 | 864 | 150,528 | 401,408 |
| 2 | 112 | 112 | 32 | | 3 | 3 | 1 | | 112 | 112 | 32 | 1 | NO | RELU | | 3,612,672 | 288 | 401,408 | 401,408 |
| 3 | 112 | 112 | 32 | | 1 | 1 | 64 | | 112 | 112 | 64 | 1 | NO | RELU | | 25,690,112 | 2,048 | 401,408 | 802,816 |
| 4 | 112 | 112 | 64 | | 3 | 3 | 1 | | 56 | 56 | 64 | 2 | NO | RELU | | 1,806,336 | 576 | 802,816 | 200,704 |
| 5 | 56 | 56 | 64 | | 1 | 1 | 128 | | 56 | 56 | 128 | 1 | NO | RELU | | 25,690,112 | 8,192 | 200,704 | 401,408 |
| 6 | 56 | 56 | 128 | | 3 | 3 | 1 | | 56 | 56 | 128 | 1 | NO | RELU | | 3,612,672 | 1,152 | 401,408 | 401,408 |
| 7 | 56 | 56 | 128 | | 1 | 1 | 128 | | 56 | 56 | 128 | 1 | NO | RELU | | 51,380,224 | 16,384 | 401,408 | 401,408 |
| 8 | 56 | 56 | 128 | | 3 | 3 | 1 | | 28 | 28 | 128 | 2 | NO | RELU | | 903,168 | 1,152 | 401,408 | 100,352 |
| 9 | 28 | 28 | 128 | | 1 | 1 | 256 | | 28 | 28 | 256 | 1 | NO | RELU | | 25,690,112 | 32,768 | 100,352 | 200,704 |
| 10 | 28 | 28 | 256 | | 3 | 3 | 1 | | 28 | 28 | 256 | 1 | NO | RELU | | 1,806,336 | 2,304 | 200,704 | 200,704 |
| 11 | 28 | 28 | 256 | | 1 | 1 | 256 | | 28 | 28 | 256 | 1 | NO | RELU | | 51,380,224 | 65,536 | 200,704 | 200,704 |
| 12 | 28 | 28 | 256 | | 3 | 3 | 1 | | 14 | 14 | 256 | 2 | NO | RELU | | 451,584 | 2,304 | 200,704 | 50,176 |
| 13 | 14 | 14 | 256 | | 1 | 1 | 512 | | 14 | 14 | 512 | 1 | NO | RELU | | 25,690,112 | 131,072 | 50,176 | 100,352 |
| 14 | 14 | 14 | 512 | | 3 | 3 | 1 | | 14 | 14 | 512 | 1 | NO | RELU | | 903,168 | 4,608 | 100,352 | 100,352 |
| 15 | 14 | 14 | 512 | | 1 | 1 | 512 | | 14 | 14 | 512 | 1 | NO | RELU | | 51,380,224 | 262,144 | 100,352 | 100,352 |
| 16 | 14 | 14 | 512 | | 3 | 3 | 1 | | 14 | 14 | 512 | 1 | NO | RELU | | 903,168 | 4,608 | 100,352 | 100,352 |
| 17 | 14 | 14 | 512 | | 1 | 1 | 512 | | 14 | 14 | 512 | 1 | NO | RELU | | 51,380,224 | 262,144 | 100,352 | 100,352 |
| 18 | 14 | 14 | 512 | | 3 | 3 | 1 | | 14 | 14 | 512 | 1 | NO | RELU | | 903,168 | 4,608 | 100,352 | 100,352 |
| 19 | 14 | 14 | 512 | | 1 | 1 | 512 | | 14 | 14 | 512 | 1 | NO | RELU | | 51,380,224 | 262,144 | 100,352 | 100,352 |
| 20 | 14 | 14 | 512 | | 3 | 3 | 1 | | 14 | 14 | 512 | 1 | NO | RELU | | 903,168 | 4,608 | 100,352 | 100,352 |
| 21 | 14 | 14 | 512 | | 1 | 1 | 512 | | 14 | 14 | 512 | 1 | NO | RELU | | 51,380,224 | 262,144 | 100,352 | 100,352 |
| 22 | 14 | 14 | 512 | | 3 | 3 | 1 | | 14 | 14 | 512 | 1 | NO | RELU | | 903,168 | 4,608 | 100,352 | 100,352 |
| 23 | 14 | 14 | 512 | | 1 | 1 | 512 | | 14 | 14 | 512 | 1 | NO | RELU | | 51,380,224 | 262,144 | 100,352 | 100,352 |
| 24 | 14 | 14 | 512 | | 3 | 3 | 1 | | 7 | 7 | 512 | 2 | NO | RELU | | 225,792 | 4,608 | 100,352 | 25,088 |
| 25 | 7 | 7 | 512 | | 1 | 1 | 1024 | | 7 | 7 | 1024 | 1 | NO | RELU | | 25,690,112 | 524,288 | 25,088 | 50,176 |
| 26 | 7 | 7 | 1024 | | 3 | 3 | 1 | | 7 | 7 | 1024 | 1 | NO | RELU | | 451,584 | 9,216 | 50,176 | 50,176 |
| 27 | 7 | 7 | 1024 | | 1 | 1 | 1024 | | 7 | 7 | 1024 | 1 | YES | RELU | | 51,380,224 | 1,048,576 | 50,176 | 1,024 |
| 28 | 1 | 1 | 1024 | | 1 | 1 | 1000 | | 1 | 1 | 1000 | 1 | NO | NO | | 1,024,000 | 1,024,000 | 1,024 | 1,000 |

DISTRIBUTED COMPUTATIONAL SYSTEM AND METHOD FOR ARTIFICIAL NEURAL NETWORK

CROSS REFERENCE TO RELATED APPLICATIONS

This application claims the benefit of PCT International Application No. PCT/KR2023/012754 filed on Aug. 29, 2023, which is herein entirely incorporated by reference.

This application also claims the benefit of Korean Patent Application No. 10-2022-0108446 filed on Aug. 29, 2022 and Korean Patent Application No. 10-2022-0175322 filed on Dec. 14, 2022, which are herein entirely incorporated by reference.

TECHNICAL FIELD

The present disclosure relates to distributed computational system and method for artificial neural network.

BACKGROUND ART

Continuous development of the information and communication industry has led to a worldwide spread of broadcasting services having a high definition (HD) resolution.

Accordingly, many users have become accustomed to high-resolution images and/or videos. Accordingly, the demand for high-resolution, high-quality video/video, such as 4K or 8K or higher ultra-high definition (UHD) video/video, has increased in various fields.

Accordingly, the amount of image/video data transmission has rapidly increased, and technology that can reduce the amount of data transmission has been required.

The technology for coding such video data was completed through high efficiency video coding (HEVC), a standard technology in 2013. HEVC is a next-generation video compression technology with a higher compression rate and lower complexity than the previous H.264/AVC technology. HEVC is a technology that can effectively compress massive data of HD and UHD video.

HEVC performs block-level encoding like previous compression standards. However, HEVC differs from H.264/AVC in that it only has one profile. There are a total of 8 core encoding technologies included in HEVC's unique profile. Specifically, encoding technologies include hierarchical coding structure technology, transformation technology, quantization technology, intra-screen predictive coding technology, inter-screen motion prediction technology, entropy coding technology, loop filter technology, and other technologies.

Since the establishment of the HEVC video codec in 2013, realistic video and virtual reality services using 4K and 8K video images have expanded. Accordingly, the versatile video coding (VVC) standard, a next-generation video codec that aims to improve performance by more than 2 times compared to HEVC, was developed. VVC is called H.266.

H.266 (VVC) was developed with the goal of more than twice the efficiency of the previous generation codec, i.e., H.265 (HEVC). VVC was initially developed with 4K or higher resolution in mind, but it was also developed for 16K-level ultra-high-resolution image processing for the purpose of responding to 360-degree images due to the expansion of the VR market. To respond to this, the display supports not only 10-bit color depth but also 16-bit color depth, and supports brightness expressions of 1000 nits, 4000 nits, and 10000 nits. Additionally, since it is being developed with the VR market and 360-degree video market in mind, it supports partial frame rates ranging from 0 to 120 FPS.

Advancement of Artificial Intelligence

Artificial intelligence (AI) is also developing rapidly. AI refers to artificially imitating human intelligence, that is, intelligence capable of performing recognition, classification, inference, prediction, and control/decision making.

Traffic between machines is exploding due to the advancement of artificial intelligence technology and the increase in internet of things (TOT) devices. In particular, artificial intelligence traffic for video analysis performed by machines is exploding. In particular, human intervention may be unnecessary or minimized when a machine performs a task. Therefore, by utilizing artificial intelligence technology, various and repetitive tasks can be handled efficiently with a minimum number of people.

Among artificial intelligence video analysis technologies, object detection technology and image classification technology use images as input. In other words, the development of artificial intelligence video analysis technology is becoming a major cause of the explosive increase in data transmission between electronic devices.

Accordingly, the number of images to be analyzed by machines is increasing exponentially, and the problems of load on communication network channels and servers and increased power consumption problems are increasing. Therefore, much research is being conducted on technology for coding images for machines to infer.

Meanwhile, conventional coding technologies are optimized for video compression and have focused on improving the compression rate while maintaining video quality based on the viewer's visual perception.

Accordingly, video coding for machine (VCM) technology is being discussed at moving picture experts group (MPEG), an international standardization group for multimedia encoding. VCM is an encoding and decoding technology for images or feature maps that considers machine inference performance and compression rate rather than human vision standards.

DETAILED DESCRIPTION OF THE PRESENT INVENTION

Technical Problems

The inventors of the present disclosure recognized that the artificial neural network model has structural characteristics including multiple layers and branches. Each layer of the artificial neural network model receives input feature maps and weights and outputs an output feature map by performing convolution, matrix multiplication, or activation function. Artificial neural network models have the characteristic of using the output value corresponding to one layer as the input value of the next layer. Here, each layer of the artificial neural network model may include a feature map containing information corresponding to a specific machine task. Therefore, the feature map of a specific layer may contain more useful information for a specific machine task than the feature map of another layer.

The inventors of the present disclosure noted that the calculation of the artificial neural network model is processed layer by layer. In particular, the inventors of the present invention recognized that the parameter sizes and computational amounts of the first and second layers of a specific artificial neural network model are extremely different. Furthermore, the inventors of the present disclosure also recognized that in the case of a specific layer, even if the parameter size of the input feature map and the parameter size of the weight are large, the parameter size of the output feature map may be very small.

Furthermore, the inventors of the present disclosure recognized the fact that the output of the first layer of the artificial neural network model processed by the first processor can be transferred to the second processor to process the calculation of the second layer by the second processor. That is, the inventors of the present disclosure recognized the fact that the calculations of each layer of an artificial neural network model having multiple layers can be distributed and processed by multiple processors. In addition, the inventors of the present disclosure recognized that if the output feature map of a specific layer processed in the first processor is transmitted to the second processor, the second processor can continue the calculation.

In particular, in the case of a specific artificial neural network model, the size of the output feature map of a specific layer may be quite small. In this case, the inventors of the present disclosure recognized that the amount of data transmission can be minimized when transmitting a small-sized output feature map.

Furthermore, the feature map of a specific layer of a specific artificial neural network model may include intermediate information required for a specific artificial neural network inference operation. Accordingly, the inventors of the present disclosure recognized that the feature map of a specific layer can be transmitted to a processor allocated to perform a specific artificial neural network inference operation.

Accordingly, the purpose of the present disclosure is to provide a processor and a system including the processor to effectively perform image analysis by a machine.

Technical Solution

To accomplish the foregoing objectives, in one example of the present disclosure, a neural processing unit (NPU) capable of encoding is provided. The NPU may comprise one or more processing elements (PEs) that perform operations for a plurality of layers of an artificial neural network to generate a plurality of output feature maps; and an encoder that encodes at least one particular output feature map among a plurality of output feature maps into a bitstream and then transmits thereof.

The encoder may be: configured to select the at least one particular output feature maps from among the plurality of output feature maps based on particular information.

The particular information may be received from a server or another NPU that receives the bitstream.

The particular information may include: identification information of the at least one particular output feature map or identification information of a layer corresponding to the particular output feature map.

The particular information may be: generated based on at least one of information on a size of the output feature map, information on a machine task performed on another NPU receiving the bitstream, and information on an artificial neural network model to be processed on the another NPU receiving the bitstream.

The bitstream may be transmitted to enable another NPU to perform calculations for subsequent layers of the artificial neural network.

The bitstream may include an identifier of the particular output feature map. In addition, the bitstream may be divided into a header and a payload.

To accomplish the foregoing objectives, in one example of the present disclosure, a neural processing unit (NPU) capable of decoding is provided. The NPU may comprise a decoder that receives a bitstream and reconstructs it into at least one particular feature map for decoding; and one or more processing elements (PEs) for performing operations of an artificial neural network model. The at least one particular feature map that is reconstructed may be a particular output feature map of a particular layer among a plurality of layers of the artificial neural network. The one or more PEs may utilize the at least one particular feature map that is reconstructed into an input feature map of a subsequent layer of the particular layer.

The NPU may transmit particular information that allows the particular layer or the at least one feature map to be selected by another NPU transmitting the bitstream.

The particular information may include identification information of the at least one particular output feature map or identification information of a layer corresponding to the particular output feature map.

The particular information may be generated based on at least one of information on a size of the output feature map, information on a machine task to be performed on the NPU, and information on the artificial neural network model.

The bitstream may include an identifier of the particular output feature map. In addition, the bitstream may be divided into a header and a payload.

Further, to accomplish the foregoing objectives, in accordance with one example of the present disclosure, a system is provided. The system may comprise a first neural processing unit configured to process a first layer section of an artificial neural network model including a plurality of layers; and a second neural processing unit configured to process a second layer section of the artificial neural network model. The first neural processing unit may be configured to input the output feature map of the last layer of the first layer section to the second neural processing unit.

A total weight size of the layers in the first layer section may be relatively smaller than a total weight size of the layers in the second layer section.

The first neural processing unit may be plural, and the second neural processing unit may be configured to sequentially process each of the output feature maps output from the first neural processing unit.

The second neural processing unit may be configured to reuse a weight corresponding to at least a number of the first neural processing unit.

A size of a first memory of the first neural processing unit may be configured to be relatively smaller than a second memory of the second neural processing unit.

The first layer section and the second layer section of the artificial neural network model may be determined based on a size of an output feature map of a particular layer.

The first layer section and the second layer section of the artificial neural network model may be determined based on a size of the sum of the weight of the layer section, respectively.

A size of a first weight of the first layer section of the artificial neural network model may be relatively smaller than a size of a second weight of the second layer section.

Effects of the Present Invention

According to the present disclosure, an artificial neural network model may be distributed to heterogeneous processors based on the size of the output feature map of a particular layer of the artificial neural network model. In this case, the amount of data transfer between the heterogeneous processors may be minimized.

According to the present disclosure, an artificial neural network model may be distributed to heterogeneous processors based on a size of an input feature map of a particular layer of the artificial neural network model. In this case, the amount of data transmission between the heterogeneous processors may be minimized.

According to the NPU provided by the present disclosure, by distributed processing of an artificial neural network, an edge-type NPU can reduce manufacturing costs and power consumption, and a server-type NPU can reduce computational load.

BRIEF DESCRIPTION OF THE DRAWINGS

FIGS. 9A to 9D are exemplary diagrams depicting an NPU including a VCM encoder and an NPU including a VCM decoder.

FIG. 13B is an exemplary table depicting data sizes for each layer in the exemplary artificial neural network model depicted in FIG. 13A.

MODES OF THE INVENTION

Figure 1:
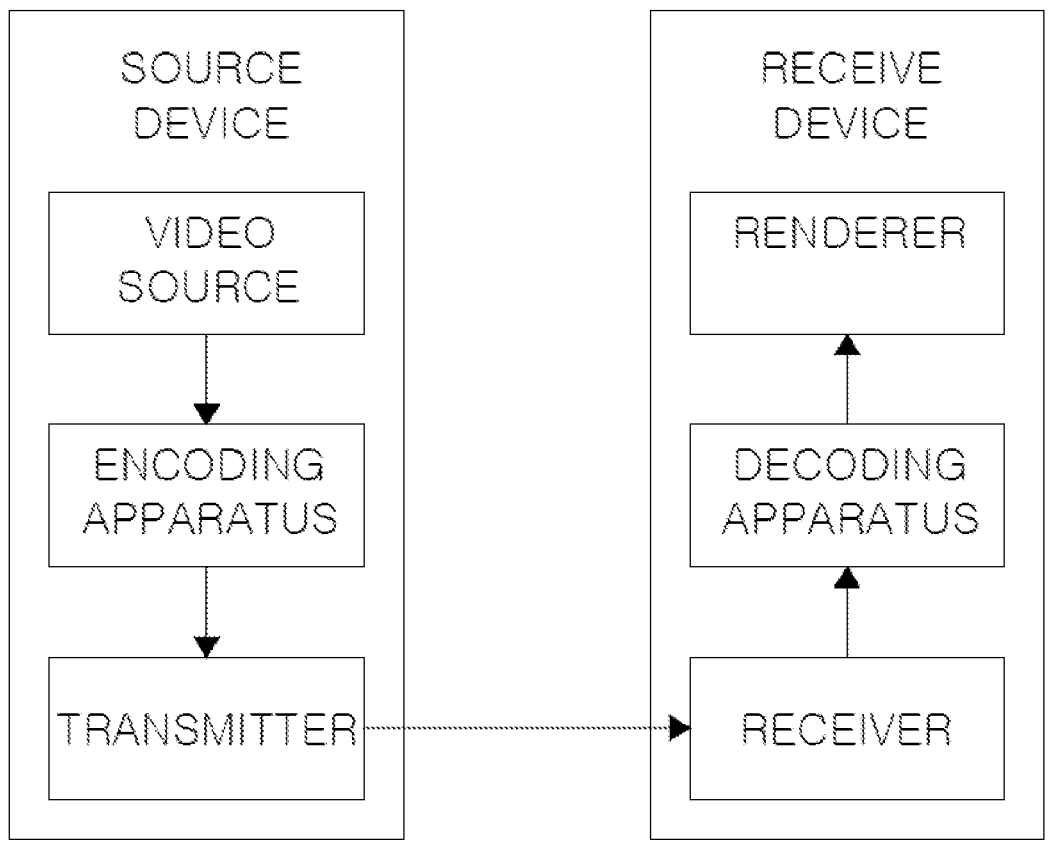
FIG. 1 is a schematic illustration of an example video/image coding system.

Certain structural or step-by-step descriptions of the examples of the present disclosure are illustrated for the purpose of describing examples according to the concepts of the present disclosure only. Examples according to the concepts of the present disclosure may be practiced in various forms and should not be construed as limiting to the examples described herein.

Examples according to the concepts of the present disclosure may be subject to various modifications and may take many forms. Accordingly, certain examples are illustrated in the drawings and described in detail herein. However, this is not intended to limit the examples according to the concepts of the present disclosure to any particular disclosure form, and should be understood to include all modifications, equivalents, or substitutions that are within the scope of the ideas and techniques of the present disclosure.

Terms such as first and/or second may be used to describe various components, but said components should not be limited by said terms. Said terms may be named only for the purpose of distinguishing one component from another. For example, without departing from the scope of the rights under the concepts of the present disclosure, a first component may be named a second component, and similarly, a second component may be named a first component.

When a component is said to be "connected" or "coupled" to another component, it may be directly connected or coupled in to that other component. However, it should be understood that other components may exist between them. On the other hand, when a component is said to be "directly connected" or "directly attached" to another component, it should be understood that there are no other components in between.

Other expressions that describe relationships between components, such as "between" and "directly between" or "adjacent to" and "directly adjacent to" should be interpreted similarly.

The terminology used in the present disclosure is used to describe certain examples only and is not intended to limit the present disclosure. Expressions in the singular include the plural unless the context clearly indicates otherwise. In this disclosure, terms such as "includes" or "has" are intended to designate the presence of the described features, numbers, steps, actions, components, parts, or combinations thereof. That is, the terms "includes" or "has" do not preclude the presence or addition of one or more other features, numbers, steps, actions, components, parts, or combinations thereof.

Unless otherwise defined, all terms used herein, including technical or scientific terms, shall have the same meaning as commonly understood by one of ordinary skill in the art to which the present disclosure belongs. Such terms, as defined in commonly used dictionaries, shall be construed to have a meaning consistent with their contextual meaning in the relevant art and shall not be construed to have an idealized or unduly formal meaning unless expressly defined in this disclosure.

In describing the examples, technical details that are familiar to those skilled in the art and not directly related to the present disclosure are omitted. This is to make the disclosure clearer without obscuring the main points of the disclosure by omitting unnecessary explanations.

The present disclosure may relate to video/image coding. For example, the methods/examples of the present disclosure may relate to the versatile video coding (VVC) standard (ITU-T Rec. H.266), next generation video/image coding standards after VVC, or other video coding related standards (e.g., high efficiency video coding (HEVC) standard (ITU-T Rec. H.265), essential video coding (EVC) standard, AVS2 standard, and the like).

The present disclosure provides various examples of video/image coding, and unless otherwise noted, the examples may be performed in combination with each other.

A video according to the present disclosure can mean a set of images over time. An image/picture generally refers to a unit that represents a single image at a particular time. A slice/tile is a unit that forms part of a picture in coding. A slice/tile can contain one or more coding tree units (CTUs). A picture can consist of one or more slices/tiles. A picture can be composed of one or more tile groups. A tile group can include one or more tiles.

A pixel or pel can refer to the smallest unit that makes up a picture (or video). Also, the term "sample" may be used as a counterpart to pixel. A sample may refer to a pixel or pixel values in general, or it may refer to pixel/pixel values in the luma component only, or it may refer to pixel/pixel values in the chroma component only. A sample may refer to a pixel value in the spatial domain or, if the pixel value is transformed to the frequency domain, may refer to a transform coefficient in the frequency domain.

A unit may represent a basic unit of image processing. A unit can include at least one of a specific region of a picture and information related to that region. A unit may include one luma block and two chroma (e.g., cb, cr) blocks. The term unit may be used interchangeably with terms such as block or area in some cases. In a typical case, an M×N block may contain a set (or array) of samples (or sample arrays) or transform coefficients with M columns and N rows.

Definitions of Terms

For ease of understanding, the following is a brief glossary of terms used in the present disclosure.

NPU: An abbreviation for neural processing unit, it can refer to a processor that is specialized for the computation of an artificial neural network model apart from the central processing unit (CPU). NPUs can be categorized into two types: those that specialize in inference computation and those that are capable of inference and learning. An NPU may include a plurality of processing elements suitable for handling convolutional operations or matrix multiplication.

AI accelerator: An AI computation accelerator, which can refer to an NPU.

ANN: Abbreviation for artificial neural network. ANN can refer to a network of nodes connected in a layer structure, mimicking the way neurons in the human brain are connected through synapses, to mimic human intelligence.

Information about the structure of an artificial neural network: This information includes information about the number of layers, feature maps of each layer, number of channels, weights, activation functions, and the like. For example, the structure of an artificial neural network can be expressed in open neural network exchange (ONNX) format, directed acyclic graph (DAG), and the like.

Information about the data locality of the neural network: information about the order of memory access requests of the neural processing units corresponding to the computation of the artificial neural network model. During the inference phase, the data locality of an AI is characterized by being practically fixed.

Thus, this can facilitate pre-fetching of data if the same neural network model is used repeatedly. It can also facilitate latency hiding, as the next data access request can be predicted. The information about data locality of the ANN may be generated by a compiler and may be included in machine code or binary code generated to drive the ANN. The machine code or binary code may be a dedicated code generated to process a specific ANN in a specific NPU, compiled in consideration of the hardware resources of the NPU and the size of the NPU's internal memory.

DNN: An abbreviation for deep neural network, which can refer to an increase in the number of hidden layers of an artificial neural network to achieve higher artificial intelligence.

CNN: An abbreviation for convolutional neural network, a neural network that functions similarly to image processing in the visual cortex of the human brain. Convolutional neural networks are known for their ability to extract features from input data and identify patterns in those features.

Transformer: Transformer is an ANN widely used for natural language processing tasks such as machine translation, text categorization, and sentiment analysis. Transformer is an ANN based on self-attention. Self-attention allows the model to evaluate the importance of different parts of the input data when making predictions. Transformers have been studied extensively as they have shown better inference performance than CNNs.

Visual transformer: Visual transformer is a specialized version of the transformer neural network for object detection or image classification. Like transformer, visual transformer can use self-attention to evaluate the importance of different parts of an input image. Visual transformer can handle input images of different sizes. Visual transformer is well suited for image classification tasks because it can learn complex spatial relationships between different parts of an image.

Kernel: This can refer to the weight matrix applied to a CNN, transformer, and the like. The value of the kernel can be determined through machine learning.

Hereinafter, the present disclosure will be described in detail by describing preferred examples of the present disclosure with reference to the accompanying drawings. Hereinafter, examples of the present disclosure will be described in detail with reference to the accompanying drawings.

FIG. 1 is a schematic illustration of an example video/image coding system.

Referring to FIG. 1, a video/image coding system may include a source device and a receive device. The source device may transmit encoded video/image information or data in the form of a file or streaming to the receive device through a digital storage medium or a network.

The source device may include a video source, an encoder, and a transmitter. The receive device may include a receiver, a decoder, and a renderer. The encoder may be referred to as a video/image encoder, and the decoder may be referred to as a video/image decoder. The transmitter may be included in the encoder. The receiver may be included in the decoder. The renderer may include a display unit, and the display unit may be configured as a separate device or external component.

The video source may acquire a video/image through a process of capturing, synthesizing, or generating a video/image. A video source may include a video/image capture device and/or a video/image generating device. A video/image capture device may include, for example, one or more cameras, a video/image archive containing previously captured video/images, and the like. A video/image generating device may include, for example, a computer, tablet, or smartphone, and may, electronically or through other means, generate a video/image. For example, a virtual video/image may be generated through a computer, and the like. In this case, the video/image capturing process may be substituted for the process of generating related data.

The encoder may encode the input video/image. The encoder may perform a series of procedures such as prediction, transformation, and quantization for compression and coding efficiency. The encoded data (encoded video/image information) may be output in the form of a bitstream.

The transmitter may transmit encoded video/image information or data output in the form of a bitstream to the receiver of the receive device in the form of a file or streaming through a digital storage medium or a network. The digital storage medium may include various storage media such as a flash drive, SD card, CD, DVD, Blu-ray disc, HDD, SSD, or the like. The transmitter may include an element for creating a media file through a predetermined file format. The transmitter may include elements for transmission through a broadcasting/communication network.

The receiver may receive/extract the bitstream and transmit it to the decoder.

The decoder may decode the video/image by performing a series of procedures such as inverse quantization, inverse transformation, and prediction corresponding to the operation of the encoder.

The renderer may render the decoded video/image. The rendered video/image may be displayed through the display unit.

Figure 2:
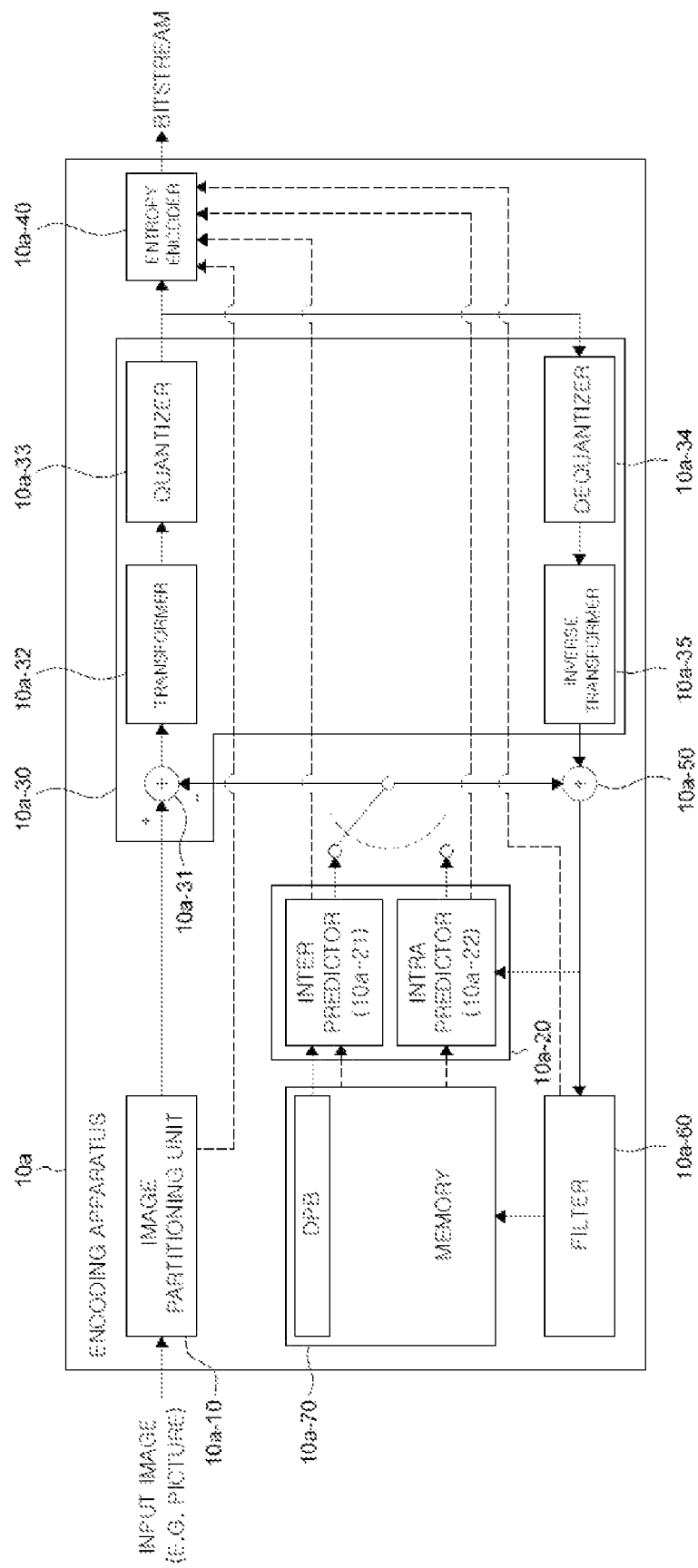
FIG. 2 is a diagram schematically illustrating a configuration of a video/image encoder.

FIG. 2 is a diagram schematically illustrating a configuration of a video/image encoder.

Hereinafter, a video encoder may include an image encoder.

Referring to FIG. 2, the encoder 10a may be configured to include an image partitioning unit 10a-10, a predictor 10a-20, a residual processor 10a-30, an entropy encoder 10a-40, an adder 10a-50, a filter 10a-60, and a memory 10a-70. The predictor 10a-20 may include an inter-predictor 10a-21 and an intra-predictor 10a-22. The residual processor 10a-30 may include a transformer 10a-32, a quantizer 10a-33, a dequantizer 10a-34, and an inverse transformer 10a-35. The residual processor 10a-30 may further include a subtractor 10a-31. The adder 10a-50 may be referred to as a reconstructor or a reconstructed block generator. The above-described image partitioning unit 10a-10, predictor 10a-20, residual processor 10a-30, entropy encoder 10a-40, adder 10a-50, and filter 10a-60 may be configured by one or more hardware components (e.g., encoder chipset or processor) according to an example. In addition, the memory 10a-70 may include a decoded picture buffer (DPB), and may be configured by a digital storage medium. The hardware component may further include a memory 10a-70 as an internal/external component.

The image partitioning unit 10a-10 may divide an input image (or a picture, a frame) input to the encoder 10a by one or more processors. As an example, the processor may be referred to as a coding unit (CU). In this case, the coding unit may be divided recursively according to a quad-tree binary-tree ternary-tree (QTBTTT) structure from a coding tree unit (CTU) or largest coding unit (LCU). For example, one coding unit may be divided into a plurality of coding units having a lower depth based on a quad tree structure, a binary tree structure, and/or a ternary structure. In this case, for example, a quad tree structure may be applied first and a binary tree structure and/or a ternary structure may be applied later. Alternatively, the binary tree structure may be applied first. A coding procedure according to the present disclosure may be performed based on the final coding unit that is no longer divided. In this case, the maximum coding unit may be directly used as the final coding unit based on coding efficiency according to image characteristics, or if necessary, the coding unit may be recursively divided into coding units of a lower depth, so that a coding unit having an optimal size may be used as a final coding unit. Here, the coding procedure may include procedures such as prediction, transformation, and restoration, which will be described later. As another example, the processor may further include a predictor (PU) or a transformer (TU). In this case, the predictor and the transformer may be divided or partitioned from the above-described final coding unit, respectively. The predictor may be a unit of sample prediction, and the transformer may be a unit for deriving a transform coefficient and/or a unit for deriving a residual signal from the transform coefficient.

A unit may be used interchangeably with terms such as a block or an area in some cases. In general, an M×N block may represent a set of samples or transform coefficients including M columns and N rows. A sample may generally represent a pixel or a value of a pixel, may represent only a pixel/pixel value of a luma component, or may represent only a pixel/pixel value of a chroma component. A sample may be used as a term corresponding to a picture (or image) as a pixel or a pel.

The subtractor 10a-31 may generate a residual signal (a residual block, residual samples, or a residual sample array) by subtracting a predicted signal (a predicted block, predicted samples, or a predicted sample array) output from a predictor 10a-20 from an input video signal (an original block, original samples, or an original sample array), and the generated residual signal is transmitted to the transformer 10a-32. A predictor 10a-20 can perform prediction on a processing target block (hereinafter referred to as a current block) and generate a predicted block including predicted samples with respect to the current block. The predictor 10a-20 can determine whether intra-prediction or inter-prediction is applied to the current block or coding unit (CU). The predictor can generate various types of information about prediction, such as prediction mode information, and transmit the information to an entropy encoder 10a-40. Information about prediction can be encoded in the entropy encoder 10a-40 and output in the form of a bitstream.

The intra-predictor 10a-22 can predict a current block with reference to samples in a current picture. Referred samples may, spatially and/or temporally, neighbor the current block, or may be separated therefrom according to a prediction mode. In intra-prediction, prediction modes may include a plurality of nondirectional modes and a plurality of directional modes. The nondirectional modes may include a DC mode and a planar mode, for example. The directional modes may include, for example, 33 directional prediction modes or 65 directional prediction modes according to a degree of minuteness of prediction direction. However, this is an example, and a higher or lower number of directional prediction modes may be used depending on the setting. The intra-predictor 10a-22 may determine a prediction mode to be applied to the current block using a prediction mode applied to neighbor blocks.

The inter-predictor 10a-21 can derive a predicted block with respect to the current block on the basis of a reference block (reference sample array) specified by a motion vector on a reference picture. Here, to reduce the quantity of motion information transmitted in an inter-prediction mode, motion information can be predicted in units of blocks, subblocks, or sample on the basis of correlation of motion information between a neighboring block and the current block. The motion information may include a motion vector and a reference picture index. The motion information may further include inter-prediction direction (L0 prediction, L1 prediction, Bi prediction, and the like) information. In the case of inter-prediction, neighboring blocks may include a spatial neighboring block present in a current picture and a temporal neighboring block present in a reference picture. The reference picture including the reference block may be the same as or different from the reference picture including the temporal neighboring block. The temporal neighboring block may be called a collocated reference block or a collocated CU (colCU) and the reference picture including the temporal neighboring block may be called a collocated picture (colPic). For example, the inter-predictor 10a-21 may form a motion information candidate list on the basis of neighboring blocks and generate information indicating which candidate is used to derive a motion vector and/or a reference picture index of the current block. Inter-prediction can be performed on the basis of various prediction modes, and in the case of a skip mode and a merge mode, the inter-predictor 10a-21 can use motion information of a neighboring block as motion information of the current block. In the case of the skip mode, a residual signal may not be transmitted differently from the merge mode. In the case of a motion vector prediction (MVP) mode, the motion vector of the current block can be indicated by using a motion vector of a neighboring block as a motion vector predictor and signaling a motion vector difference.

The predictor 10a-20 may generate a prediction signal based on various prediction methods to be described later. For example, the predictor may apply intra-prediction or inter-prediction to predict one block, and may simultaneously apply both intra-prediction and inter-prediction. This can be called combined inter and intra prediction (CIIP). In addition, the predictor may perform intra block copy (IBC) to predict the block. IBC may be used for video/video coding of content such as a game, for example, screen content coding (SCC). IBC basically performs prediction within the current picture, but may be performed similarly to inter-prediction in that a reference block is derived within the current picture. That is, IBC may use at least one of the inter-prediction techniques described in the present disclosure.

A predicted signal generated through the inter-predictor 10a-21 or the intra-predictor 10a-22 can be used to generate a reconstructed signal or a residual signal. The transformer 10a-32 can generate transform coefficients by applying a transform technique to a residual signal. For example, the transform technique may include at least one of DCT (Discrete Cosine Transform), DST (Discrete Sine Transform), GBT (Graph-Based Transform), and CNT (Conditionally Non-linear Transform). Here, GBT refers to transform obtained from a graph representing information on relationship between pixels. CNT refers to transform obtained on the basis of a predicted signal generated using all previously reconstructed pixels. Further, the transform process may be applied to square pixel blocks having the same size or applied to non-square blocks having variable sizes.

A quantizer 10a-33 may quantize transform coefficients and transmit the quantized transform coefficients to the entropy encoder 10a-40, and the entropy encoder 10a-40 may encode a quantized signal (information about the quantized transform coefficients) and output the encoded signal as a bitstream. The information about the quantized transform coefficients may be called residual information. The quantizer 10a-33 may rearrange the quantized transform coefficients in the form of a block into the form of a one-dimensional vector on the basis of a coefficient scan order and may generate information about the quantized transform coefficients on the basis of the quantized transform coefficients in the form of a one-dimensional vector. The entropy encoder 10a-40 can execute various encoding methods such as exponential Golomb, context-adaptive variable length coding (CAVLC) and context-adaptive binary arithmetic coding (CABAC), for example.

The entropy encoder 10a-40 may encode information necessary for video/image reconstruction (e.g., values of syntax elements and the like) along with or separately from the quantized transform coefficients. Encoded information (e.g., video/image information) may be transmitted or stored in the form of a bitstream in network abstraction layer (NAL) unit. The video/image information may further include information about various parameter sets, such as an adaptation parameter set (APS), a picture parameter set (PPS), a sequence parameter set (SPS), or a video parameter set (VPS). In addition, the video/image information may further include general constraint information. Signaling/transmitted information and/or syntax elements described later in the present disclosure may be encoded through the above-described encoding procedure and included in the bitstream. The bitstream may be transmitted through a network or stored in a digital storage medium. Here, the network may include a broadcast network and/or a communication network and the digital storage medium may include various storage media such as a flash drive, SD card, CD, DVD, Blue-ray disc, HDD, or SSD. A transmitter (not shown) which transmits the signal output from the entropy encoder 10a-40 and/or a storage (not shown) which stores the signal may be configured as internal/external elements of the encoder 10a, and the transmitter may be included in the entropy encoder 10a-40.

The quantized transform coefficients output from the quantizer 10a-33 may be used to generate a prediction signal. For example, a residual signal (residual block or residual samples) can be reconstructed by applying inverse quantization and inverse transformation to the quantized transform coefficients through the inverse quantizer 10a-34 and the inverse transformer 10a-35. The adder 10a-50 may add the reconstructed residual signal to the predicted signal output from the predictor 10a-20 to generate a reconstructed signal (a reconstructed picture, a reconstructed block, a set of reconstructed samples, or an array of reconstructed samples). If there are no residuals for the block being processed, such as when skip mode is applied, the predicted block may be used as the reconstructed block. The generated reconstructed signal can be used for intra-prediction of the next processing target block in the current picture or used for inter-prediction of the next picture through filtering which will be described later.

Meanwhile, luma mapping with chroma scaling (LMCS) may be applied during picture encoding and/or reconstruction.

The filter 10a-60 may improve subjective/objective image quality by applying filtering to the reconstructed signal. For example, the filter 10a-60 may generate a modified reconstructed picture by applying various filtering methods to the reconstructed picture, and store the modified reconstructed picture into the memory 10a-70, specifically the memory 10a-70 can be stored in the DPB. The various filtering methods may include, for example, deblocking filtering, sample adaptive offset (SAO), an adaptive loop filter, a bilateral filter, and the like. The filter 10a-60 may generate various kinds of filtering-related information and transmit it to the entropy encoder 10a-90, as will be described later in the description of each filtering method. The filtering-related information may be encoded by the entropy encoder 10a-90 and outputted in the form of a bitstream.

The modified reconstructed picture transmitted to the memory 10a-70 may be used as a reference picture in the inter-predictor 10a-80. When inter-prediction is applied through the encoder, prediction mismatch between the encoder 10a and the decoder can be avoided, and coding efficiency can also be improved.

The DPB of the memory 10a-70 may store the modified reconstructed picture to be used as a reference picture in the inter-predictor 10a-21. The memory 10a-70 may store motion information of a block from which motion information in the current picture is derived (or encoded) and/or motion information of blocks in an already reconstructed picture. The stored motion information may be transmitted to the inter-predictor 10a-21 to be used as motion information of a spatial neighboring block or motion information of a temporal neighboring block. The memories 10a-70 may store reconstructed samples of blocks reconstructed in the current picture, and may transmit the reconstructed samples to the intra-predictor 10a-22.

Figure 3:
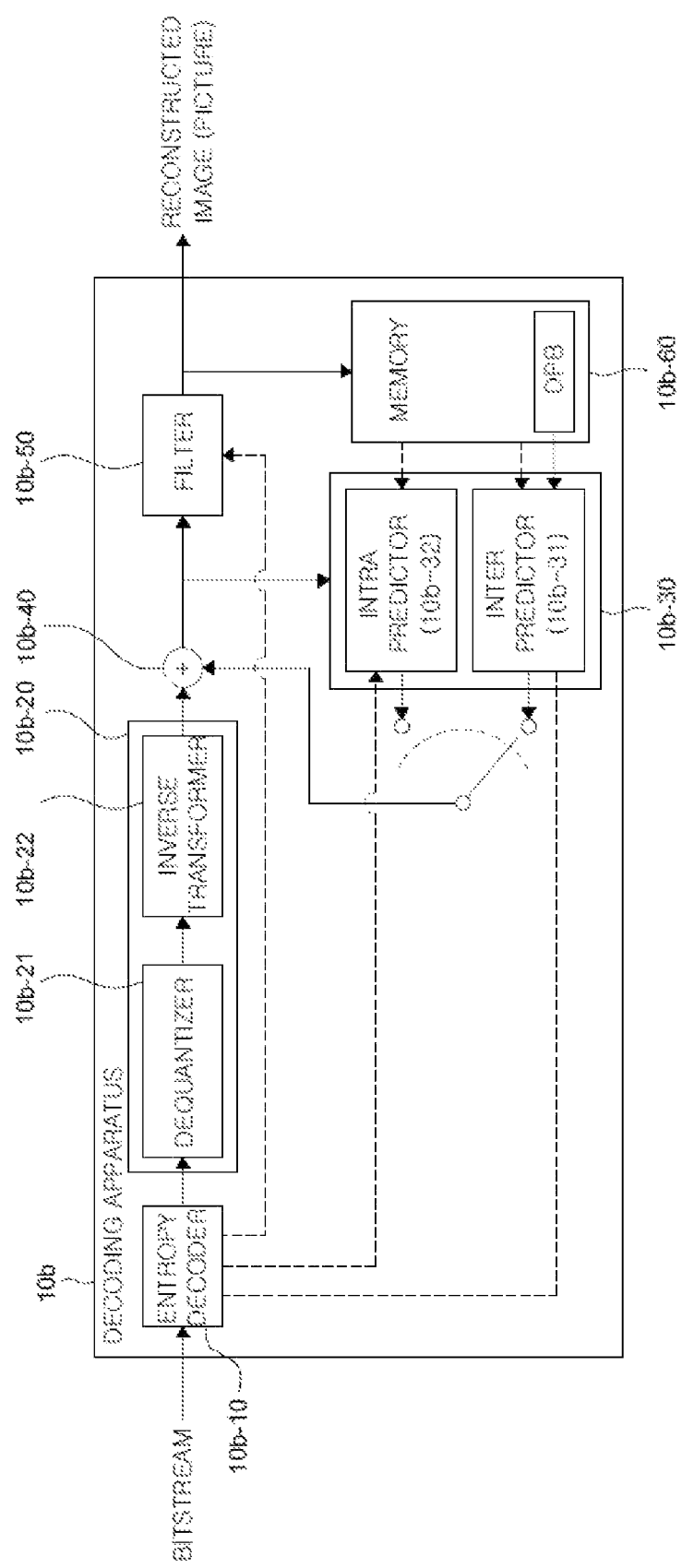
FIG. 3 is a diagram schematically illustrating a configuration of a video/image decoder.

FIG. 3 is a diagram schematically illustrating a configuration of a video/image decoder.

Referring to FIG. 3, the decoder 10b may be configured to include an entropy decoder 10b-10, a residual processor 10b-20, a predictor 10b-30, an adder 10b-40, a filter 10b-50, and a memory 10b-60. The predictor 10b-30 may include an inter-predictor 10b-31 and an intra-predictor 10b-32. The residual processor 10b-20 may include a dequantizer 10b-21 and an inverse transformer 10b-22. The entropy decoder 10b-10, the residual processor 10b-20, the predictor 10b-30, the adder 10b-40, and the filter 10b-50 may be configured by one hardware component (e.g., a decoder chipset or a processor) according to an example. In addition, the memory 10b-60 may include a decoded picture buffer (DPB), and may be configured by a digital storage medium. The hardware component of the memory 10b-60 may be configured as an internal or external component.

When a bitstream including video/image information is input into the decoder 10b, the decoder 10b may reconstruct an image corresponding to a process in which the video/image information is processed in the encoder 10a of FIG. 2. For example, the decoder 10b may derive units/blocks based on block division related information obtained from the bitstream. The decoder 10b may perform decoding by using a processing unit applied in the encoder. Thus, the processing unit of decoding may be, for example, a coding unit, and the coding unit may be divided according to a quad tree structure, a binary tree structure, and/or a ternary tree structure from a coding tree unit or a largest coding unit. One or more transformers may be derived from a coding unit. In addition, the reconstructed image signal decoded and output through the decoder 10b may be reproduced through the playback device.

The decoder 10b may receive a signal output from the encoder 10a of FIG. 2 in the form of a bitstream, and the received signal may be decoded through the entropy decoder 10b-10. For example, the entropy decoder 10b-10 may parse the bitstream to derive information (e.g., video/image information) required for image reconstruction (or video reconstruction). The video/image information may further include information about various parameter sets, such as an adaptation parameter set (APS), a picture parameter set (PPS), a sequence parameter set (SPS), or a video parameter set (VPS). In addition, the video/image information may further include general constraint information.

The decoder may decode the picture further based on the information on the parameter set and/or the general constraint information. Signaling/received information and/or syntax elements, described later in the present disclosure, may be decoded through the decoding procedure and obtained from the bitstream. For example, the entropy decoder 10b-10 may decode information in the bitstream on the basis of a coding method such as exponential Golomb, CAVLC, or CABAC and may output syntax element values necessary for image reconstruction and quantized values of transform coefficients with respect to residual. More specifically, the CABAC entropy decoding method receives a bin corresponding to each syntax element in the bitstream, determines a context model using decoding target syntax element information and decoding information of neighboring and decoding target blocks or information on symbols/bins decoded in a previous stage, predicts bin generation probability according to the determined context model and performs arithmetic decoding of bins to generate a symbol corresponding to each syntax element value. In this case, the CABAC entropy decoding method may update the context model by using the decoded symbol/bin information for the context model of the next symbol/bin after determining the context model. Information about prediction among the information decoded by the entropy decoder 10b-10 is provided to the predictor 10b-30, and information about the residual on which entropy decoding is provided by the entropy decoder 10b-10, that is, the quantized transform coefficients and related parameter information may be input to the dequantizer 10b-21.

Also, information on filtering among the information decoded by the entropy decoder 10b-10 may be provided to the filter 10b-50. On the other hand, a receiver (not shown) that receives a signal output from the encoder may be further configured as an internal/external element of the decoder 10b, or the receiver may be a component of the entropy decoder 10b-10. On the other hand, the decoder according to the present disclosure may be referred to as a video/image/picture decoder, and the decoder may be divided into an information decoder (video/image/picture information decoder) and a sample decoder (video/image/picture sample decoder). The information decoder may include the entropy decoder 10b-10, and the sample decoder may include at least one of the dequantizer 10b-21, the inverse transformer 10b-22, the predictor 10b-30, the adder 10b-40, the filter 10b-50, and the memory 10b-60.

The dequantizer 10b-21 may inverse quantize the quantized transform coefficients to output the transform coefficients. The dequantizer 10b-21 may rearrange the quantized transform coefficients in a two-dimensional block form. In this case, the rearrangement may be performed based on the coefficient scan order performed by the encoder. The dequantizer 10b-21 may perform inverse quantization on the quantized transform coefficients using a quantization parameter (e.g., quantization step size information) and obtain transform coefficients.

The inverse transformer 10b-22 inverse transforms the transform coefficients to obtain a residual signal (residual block, residual sample array).

The predictor may perform prediction on the current block and generate a predicted block including prediction samples for the current block. The predictor may determine whether intra-prediction or inter-prediction is applied to the current block based on the prediction information output from the entropy decoder 10b-10, and may determine a specific intra/inter prediction mode.

The predictor may generate a prediction signal based on various prediction methods to be described later. For example, the predictor may apply intra-prediction or inter-prediction to predict one block, and may simultaneously apply both intra-prediction and inter-prediction. This can be referred to as combined inter and intra prediction (CIIP). In addition, the predictor may perform intra block copy (IBC) to predict the block. IBC may be used for video/video coding of content such as a game, for example, screen content coding (SCC). IBC basically performs prediction within the current picture, but may be performed similarly to inter-prediction in that a reference block is derived within the current picture. That is, IBC may use at least one of the inter-prediction techniques described in the present disclosure.

The intra-predictor 10b-32 may predict the current block with reference to samples in the current picture. The referenced samples may be located in the neighborhood of the current block or may be located apart from each other according to the prediction mode. In intra-prediction, prediction modes may include a plurality of non-directional modes and a plurality of directional modes. The intra-predictor 10b-32 may determine the prediction mode applied to the current block by using the prediction mode applied to the neighboring block.

The inter-predictor 10b-31 may derive the predicted block for the current block based on the reference block (reference sample array) specified by the motion vector on the reference picture. In this case, in order to reduce the amount of motion information transmitted in the inter-prediction mode, the motion information may be predicted in units of blocks, subblocks, or samples based on the correlation between motion information between neighboring blocks and the current block. The motion information may include a motion vector and a reference picture index. The motion information may further include inter-prediction direction (L0 prediction, L1 prediction, Bi prediction, and the like) information.

In the case of inter-prediction, the neighboring blocks may include spatial neighboring blocks existing in the current picture and temporal neighboring blocks present in the reference picture. For example, the inter-predictor 10b-31 may construct a motion information candidate list based on neighboring blocks, and derive a motion vector and/or a reference picture index of the current block based on the received candidate selection information. Inter-prediction may be performed based on various prediction modes, and the information on the prediction may include information indicating the mode of inter-prediction for the current block.

The adder 10b-40 may generate a reconstructed signal (reconstructed picture, reconstructed block, or reconstructed sample array) by adding the obtained residual signal to the predicted signal (predicted block or predicted sample array) output from the predictor 10b-30. When there is no residual with respect to the processing target block as in a case in which the skip mode is applied, the predicted block may be used as a reconstructed block.

The adder 10b-40 may be referred to as a reconstruction unit or a reconstruction block generation unit. The generated reconstructed signal may be used for intra-prediction of the next processing object block in the current picture, may be output through filtering as described below, or may be used for inter-prediction of the next picture.

Meanwhile, luma mapping with chroma scaling (LMCS) may be applied in the picture decoding process.

The filter 10b-50 can improve subjective/objective picture quality by applying filtering to the reconstructed signal. For example, the filter 10b-50 can generate a modified reconstructed picture by applying various filtering methods to the reconstructed picture and transmit the modified reconstructed picture to a memory 60, specifically to the DPB of the memory 60. The various filtering methods may include, for example, deblocking filtering, sample adaptive offset, adaptive loop filter, and bilateral filter.

The (modified) reconstructed picture stored in the DPB of the memory 10b-60 may be used as a reference picture in the inter-predictor 10b-31. The memory 10b-60 may store motion information of a block in which motion information in the current picture is derived (or decoded) and/or motion information of blocks in an already reconstructed picture. The stored motion information may be transmitted to the inter-predictor 10b-31 to be used as motion information of a spatial neighboring block or motion information of a temporal neighboring block. The memory 10b-60 may store reconstructed samples of blocks reconstructed in the current picture, and may transmit the reconstructed samples to the intra-predictor 10b-32.

In the present disclosure, examples described in the predictor 10b-30, the dequantizer 10b-21, the inverse transformer 10b-22, and the filter 10b-50 of the decoder 10b may be applied to be the same or corresponding to the predictor 10a-20, the dequantizer 10a-34, the inverse transformer 10a-35, and the filter 10a-60 of the encoder 10a, respectively.

As described above, in video coding, prediction is performed to increase compression efficiency. Through this, it is possible to generate a predicted block including prediction samples for the current block, which is a block to be coded. Here, the predicted block includes prediction samples in a spatial domain (or pixel domain). The predicted block is derived identically in the encoder and the decoder, and the encoder may increase image coding efficiency by signaling, to the decoder, information (residual information) about the residual between the original block and the predicted block, rather than the original sample value of the original block itself. The decoder may derive a residual block including residual samples based on the residual information, may generate a reconstructed block including reconstructed samples by adding the residual block and the predicted block, and may generate a reconstructed picture including the reconstructed blocks.

The residual information may be generated through transformation and quantization procedures. For example, the encoder derives a residual block between the original block and the predicted block, and performs a transform procedure on residual samples (residual sample array) included in the residual block to derive transform coefficients, and by performing a quantization procedure on the transform coefficients to derive quantized transform coefficients, the associated residual information may be signaled to the decoder (via a bitstream). Here, the residual information may include value information of the quantized transform coefficients, location information, a transform technique, a transform kernel, and information such as a quantization parameter. The decoder may perform an inverse quantization/inverse transformation procedure based on the residual information and derive residual samples (or residual blocks). The decoder may generate a reconstructed picture based on the predicted block and the residual block. The encoder may also inverse quantize/inverse transform the quantized transform coefficients for reference for inter-prediction of a later picture to derive a residual block, and generate a reconstructed picture based thereon.

Neural Processing Unit

Figure 4:
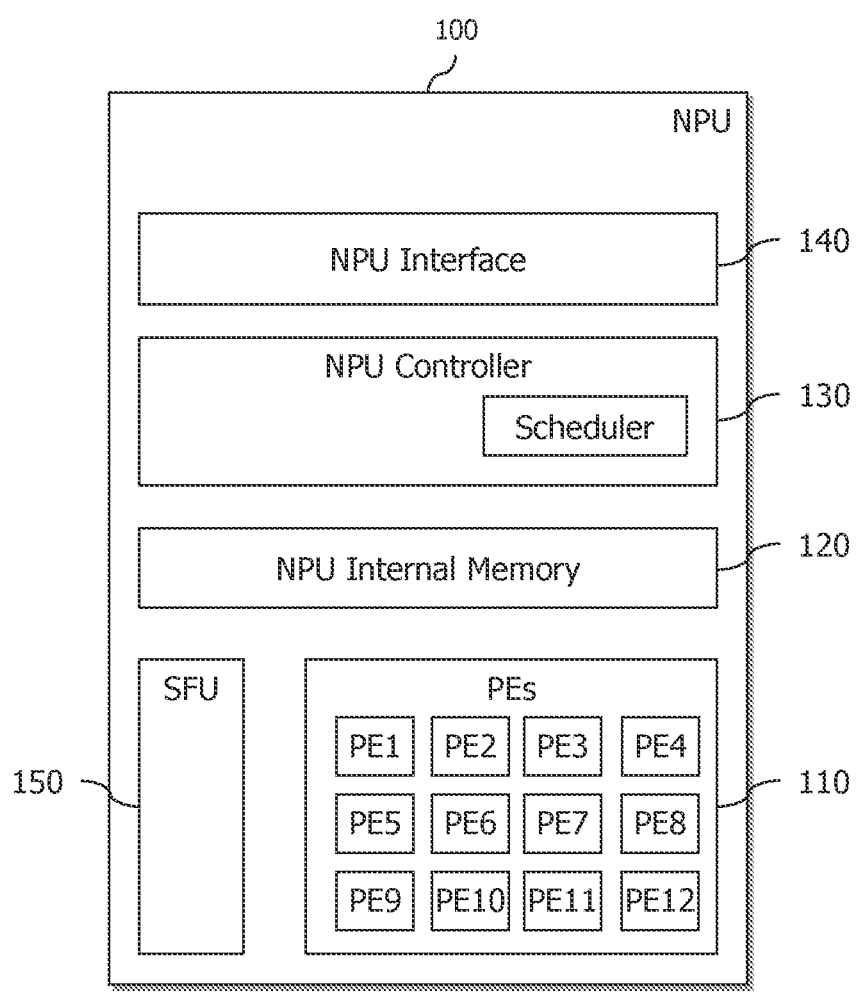
FIG. 4 is a schematic conceptual diagram illustrating a neural processing unit according to the present disclosure.

FIG. 4 is a schematic conceptual diagram illustrating a neural processing unit according to the present disclosure.

Referring to FIG. 4, a neural processing unit (NPU) 100 is a processor specialized to perform operations of an artificial neural network.

An artificial neural network refers to a network of artificial neurons that multiply and add weights when multiple inputs or stimuli come in, and additionally transform and transmit the added value through an activation function. The artificial neural network learned in this way can be used to output inference results from input data.

The NPU 100 may be a semiconductor device implemented by an electric/electronic circuit. The electric/electronic circuit may refer to a circuit including a large number of electronic elements (e.g., transistors, capacitors).

In case of transformer and/or CNN based artificial neural network model, the NPU 100 may select and process matrix multiplication operations, convolution operations, and the like according to the architecture of the artificial neural network.

For example, in each layer of a convolutional neural network (CNN), the input feature map corresponding to the input data and the kernel corresponding to the weight may be a matrix composed of a plurality of channels. A convolution operation of the input feature map and the kernel is performed, and a convolution operation and a pooled output feature map are generated in each channel. An activation map for the corresponding channel is generated by applying an activation function to the output feature map. Afterwards, pooling on the activation map may be applied. Here, the activation map may be generically referred to as the output feature map.

However, examples of the present disclosure are not limited thereto, and the output feature map may mean that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for additional algorithms.

The NPU 100 may be configured to include a plurality of processing elements 110 for processing convolution and matrix multiplication required for the above-described artificial neural network operation.

The NPU 100 may be configured to include each processing circuitry optimized for matrix-multiplication operation, convolution operation, activation function operation, pooling operation, stride operation, batch-normalization operation, skip-connection operation, concatenation operation, quantization operation, clipping operation, and padding operation necessary for the above-described artificial neural network operation.

For example, the NPU 100 may be configured to include the SFU 150 for processing at least one of the algorithms among activation function operation, pooling operation, stride operation, batch-normalization operation, skip-connection operation, concatenation operation, quantization operation, clipping operation, and padding operation as described above.

Specifically, the NPU 100 may include a plurality of processing elements (PE) 110, an SFU 150, an NPU internal memory 120, an NPU controller 130, and an NPU interface 140. Each of the plurality of processing elements 110, SFU 150, NPU internal memory 120, NPU controller 130, and NPU interface 140 may be formed of a semiconductor circuitry in which numerous transistors are connected. Therefore, some of them may be difficult to identify and distinguish with the naked eye, and can only be identified through operation thereof.

For example, an arbitrary circuit may operate as a plurality of processing elements 110 or as an NPU controller 130. The NPU controller 130 may be configured to perform the function of a controller configured to control an artificial neural network inference operation of the NPU 100.

The NPU 100 may include an NPU internal memory 120 configured to store parameters of an artificial neural network model that can be inferred from the plurality of processing elements 110 and the SFU 150 and an NPU controller 130 including a scheduler configured to control an operation schedule of the plurality of processing elements 110, the SFU 150, and the NPU internal memory 120.

The NPU 100 may be configured to process feature maps corresponding to encoding and decoding schemes using SVC or SFC.

The plurality of processing elements 110 may perform some operations for an artificial neural network.

SFU 150 may perform another portion of the operation for the artificial neural network.

The NPU 100 may be configured to hardware-accelerate the computation of the artificial neural network model using the plurality of processing elements 110 and the SFU 150.

The NPU interface 140 may communicate with various components connected to the NPU 100 through a system bus, for example, a memory.

The NPU controller 130 may include a scheduler configured to control an operation of a plurality of processing elements 110 for inference operation of the neural processing unit 100, an operation of the SFU 150, and a reading and writing order of the NPU internal memory 120.

The scheduler in the NPU controller 130 may be configured to control the plurality of processing elements 110, the SFU 150, and the NPU internal memory 120 based on data locality information or structure information of the artificial neural network model.

The scheduler in the NPU controller 130 may analyze the structure of the artificial neural network model to operate in the plurality of processing elements 110 and the SFU 150 or may be provided with previously analyzed information. The information may be included in compiled machine code or binarized code. For example, data of an artificial neural network that can be included in an artificial neural network model may include at least a portion of node data of each layer (i.e., feature map), arrangement data of layers, locality information or structure information, and weight data of each network connecting the nodes of each layer (i.e., weight kernel).

The machine code or binary code may be determined based on the corresponding NPU 100, respectively. For example, when processing the artificial neural network model on one NPU, the machine code or binary code may be compiled for one NPU. For example, in the case of distributed processing of the artificial neural network model on a first NPU and a second NPU, the respective machine code or binary code may be compiled for the first NPU and the second NPU, respectively.

The compiled machine code or binary code may be stored in memory provided inside the NPU controller 130 or in the NPU internal memory 120.

The scheduler in the NPU controller 130 may schedule an operation order of the artificial neural network model to be performed by the NPU 100 based on data locality information or structure information of the artificial neural network model.

The scheduler in the NPU controller 130 may obtain a memory address value in which a feature map and weight data of a layer of an artificial neural network model are stored based on data locality information or structure information of the artificial neural network model. For example, the scheduler in the NPU controller 130 may obtain a memory address value at which a feature map and weight data of a layer of an artificial neural network model stored in a memory are stored. Therefore, the scheduler in the NPU controller 130 may retrieve the feature map and weight data of the layer of the artificial neural network model to be driven from the main memory and store them in the NPU internal memory 120.

A feature map of each layer may have a corresponding memory address value.

Each weight data may have a corresponding memory address value.

The scheduler in the NPU controller 130 may schedule the operation order of the plurality of processing elements 110 based on the data locality information or structure information of an artificial neural network model, for example, arrangement data of artificial neural network layers of an artificial neural network model, locality information, or information about a structure.

Because the scheduler in the NPU controller 130 schedules based on information about the data locality or structure of the artificial neural network model, it may operate differently from the scheduling concept of a typical CPU. Scheduling in a typical CPU operates to achieve the best possible efficiency, considering fairness, efficiency, reliability, response time, and the like.

Conventional CPUs use algorithms to schedule tasks in consideration of data such as the priority order of each processing and the processing time of the operation.

In contrast, the scheduler in the NPU controller 130 can control the NPU 100 in a processing order of the NPU 100 determined based on information about the locality or structure of the data of the artificial neural network model.

Further, the scheduler in the NPU controller 130 may drive the NPU 100 according to a processing order determined based on information about the data locality information or structure of the artificial neural network model and/or information about the data locality information or structure of the neural processing unit 100 to be used.

However, the present disclosure is not limited to the data locality information or the information about the structure of the NPU 100.

The scheduler in the NPU controller 130 may be configured to store the data locality information or the information about the structure of the artificial neural network.

That is, even though only the data locality information or the information about the structure of the artificial neural network of the artificial neural network model is utilized, the scheduler in the NPU controller 130 may determine a processing sequence.

Moreover, the scheduler in the NPU controller 130 may determine the processing order of the NPU 100 by considering the data locality information or the information about the structure of the artificial neural network model and data locality information or information about a structure of the NPU 100. Furthermore, optimization of the processing is possible according to the determined processing order.

The plurality of processing elements 110 refers to a configuration in which a plurality of processing elements PE1 to PE12 configured to operate feature map and weight data of the artificial neural network is disposed. Each processing element may include a multiply and accumulate (MAC) operator and/or an arithmetic logic unit (ALU) operator. However, the examples according to the present disclosure are not limited thereto.

Each processing element may be configured to optionally further include an additional special function unit for processing the additional special function.

For example, it is also possible for the processing element PE to be modified and implemented to further include a batch-normalization unit, an activation function unit, an interpolation unit, and the like.

The SFU 150 may include a circuit configured to select and process operations such as activation function operation, pooling operation, stride operation, batch-normalization operation, skip-connection operation, concatenation operation, quantization operation, clipping operation, padding operation, and the like according to the architecture of an artificial neural network. That is, the SFU 150 may include a plurality of special function arithmetic processing circuit units.

Even though FIG. 4 illustrates a plurality of processing elements as an example, operators implemented by a plurality of multiplier and adder trees may also be configured to be implemented in parallel in one processing element, instead of the MAC. In this case, the plurality of processing elements 110 may also be referred to as at least one processing element including a plurality of operators.

The plurality of processing elements 110 is configured to include a plurality of processing elements PE1 to PE12. The plurality of processing elements PE1 to PE12 in FIG. 4 is just an example for the convenience of description and the number of the plurality of processing elements PE1 to PE12 is not limited to 12 or any other integer number. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A size of the plurality of processing elements 110 may be designed in consideration of the characteristics of the artificial neural network model in which the NPU 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 5A:
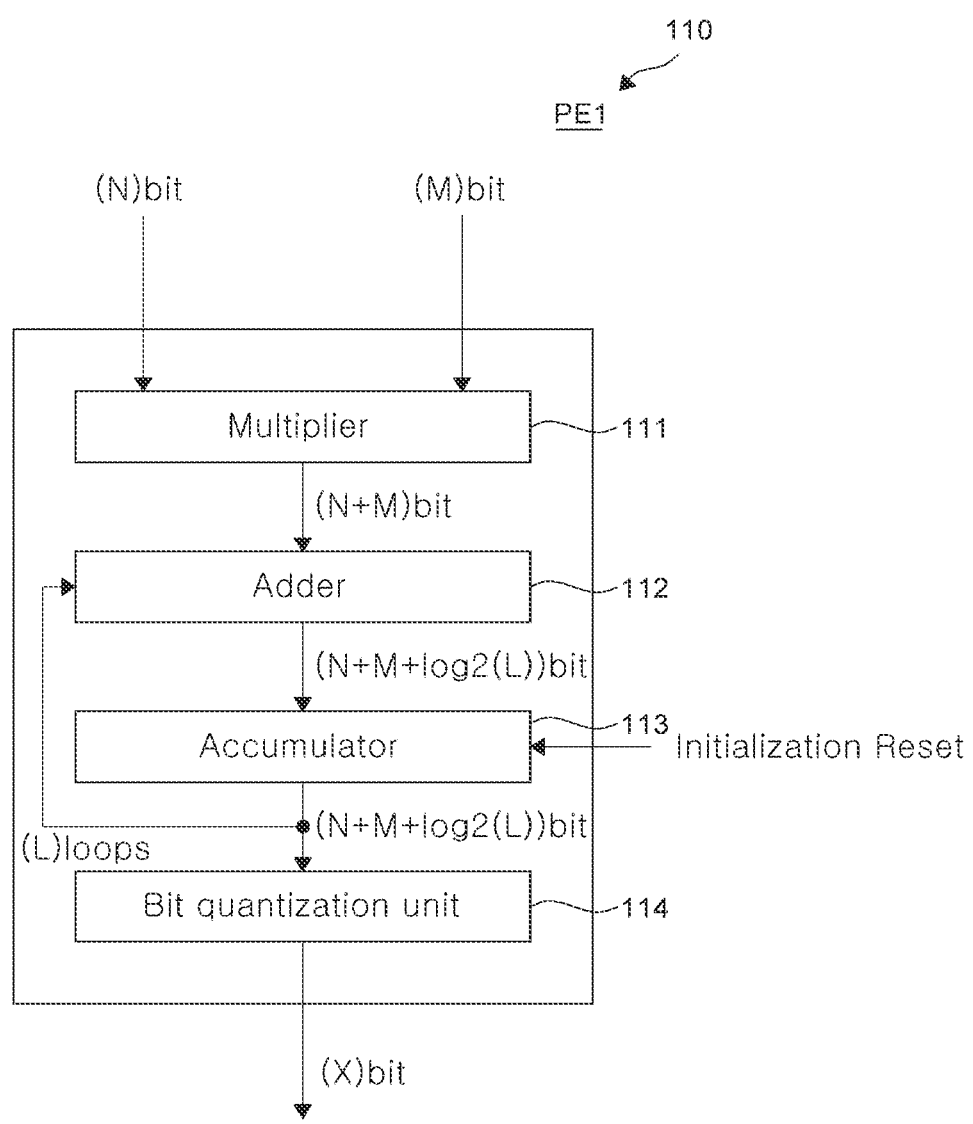
FIG. 5A is a schematic conceptual diagram illustrating a processing element of one of a plurality of processing elements applicable to the present disclosure.

FIG. 5A illustrates one processing element among a plurality of processing elements that may be applied to the present disclosure.

The NPU 100 according to the examples of the present disclosure may include the plurality of processing elements 110, the NPU internal memory 120 configured to store an artificial neural network model inferred from the plurality of processing elements 110, and the NPU scheduler 130 configured to control the plurality of processing elements 110 and the NPU internal memory 120 based on data locality information or information about a structure of the artificial neural network model, and the plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

The first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristics of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+log 2(L)) bits. Here, L is an integer greater than zero.

When the accumulation is completed, the accumulator 113 is applied with an initialization reset to initialize the data stored in the accumulator 113 to zero. However, the examples according to the present disclosure are not limited thereto.

The bit quantizer 114 may reduce the bit width of the data output from the accumulator 113. The bit quantizer 114 may be controlled by the NPU scheduler 130. The bit width of the quantized data may be output to (X) bits. Here, X is an integer greater than zero. According to the above-described configuration, the plurality of processing elements 110 is configured to perform the MAC operation and the plurality of processing elements 110 can quantize the MAC operation result to output the result. The quantization may have an effect that the larger the (L) loops, the smaller the power consumption, which leads to reduced heat generation. Consequently, the possibility of the erroneous operation of the NPU 100 due to the heat generation may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU scheduler 130 may also be configured to extract quantized information by analyzing the artificial neural network model. Accordingly, the output data (X) bit is converted to a quantized bit width to be output so as to correspond to the quantized data size. The output data (X) bit of the bit quantizer 114 may be stored in the NPU internal memory 120 with a quantized bit width.

The plurality of processing elements 110 of the NPU 100 according to an example of the present disclosure may include a multiplier 111, an adder 112, and an accumulator 113. The bit quantizer 114 may be selected according to whether quantization is applied or not.

Figure 5B:
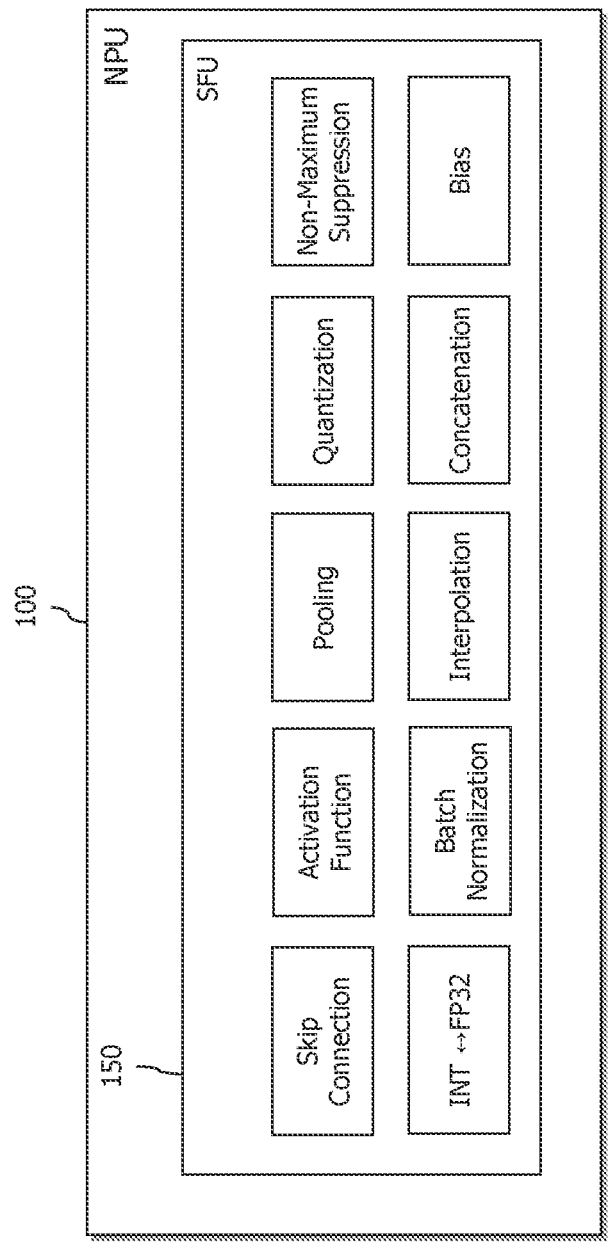
FIG. 5B is a schematic conceptual diagram illustrating an SFU that may be applicable to the present disclosure.

FIG. 5B is a schematic conceptual diagram illustrating an SFU that may be applicable to the present disclosure.

Referring to FIG. 5B, the SFU 150 may include several functional units. Each functional unit can be operated selectively. Each functional unit can be selectively turned on or turned off. That is, each functional unit can be selected.

In other words, the SFU 150 may include various circuit units required for inference operations of an artificial neural network.

For example, the circuit units of the SFU 150 may include a functional unit for skip-connection operation, a functional unit for activation function operation, a functional unit for pooling operation, a functional unit for quantization operation, a functional unit for non-maximum suppression (NMS) operation, a functional unit for integer to floating point conversion (INT to FP32) operation, a functional unit for a batch-normalization operation, a functional unit for an interpolation operation, a functional unit for a concatenation operation, a functional unit for a bias operation, and the like.

Functional units of the SFU 150 may be selectively turned on or off according to the data locality information of the artificial neural network model. The data locality information in the artificial neural network model may include control information related to turning on or off the corresponding functional units when operations are performed for a particular layer.

An activated unit among functional units of the SFU 150 may be turned on. In this way, when some functional units of the SFU 150 are selectively turned off, power consumption of the NPU 100 can be reduced. Meanwhile, in order to turn off some functional units, power gating may be used. Alternatively, clock gating may be performed to turn off some functional units.

Figure 6:
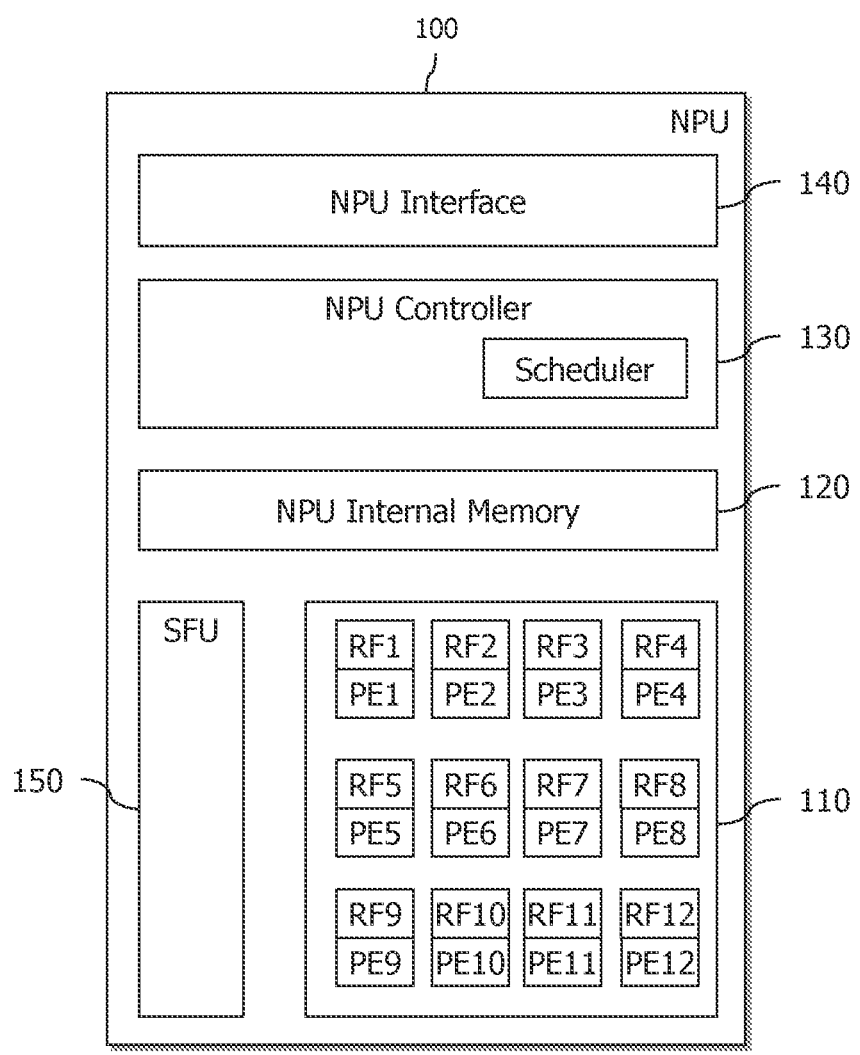
FIG. 6 is an exemplary diagram illustrating a variation of the neural processing unit 100 shown in FIG. 4.

FIG. 6 is an exemplary diagram illustrating a variation of the neural processing unit 100 shown in FIG. 4.

Since the NPU 100 shown in FIG. 6 is substantially the same as the processing unit 100 exemplarily shown in FIG. 4, except for the plurality of processing elements 110, redundant descriptions may be omitted herein for ease of explanation only.

The plurality of processing elements 110 exemplarily illustrated in FIG. 6 may further include, in addition to the plurality of processing elements PE1 to PE12, respective register files RF1 to RF12 corresponding to each of the processing elements PE1 to PE12.

The plurality of processing elements PE1 to PE12 and the plurality of register files RF1 to RF12 shown in FIG. 6 are illustrative only, and the number of the plurality of processing elements PE1 to PE12 and the plurality of register files RF1 to RF12 is not limited thereto.

The size or number of the plurality of processing elements 110 may be determined by the number of the plurality of processing elements PE1 to PE12 and the number of the plurality of register files RF1 to RF12. The size of the plurality of processing elements 110 and the plurality of register files RF1 to RF12 may be implemented in the form of an N×M matrix. Where N and M are integers greater than zero.

The array size of the plurality of processing elements 110 can be designed to take into account the characteristics of the artificial neural network model on which the NPU 100 operates. In addition, the memory size of the register file may be determined by considering the data size of the artificial neural network model to be operated, the required operating speed, the required power consumption, and the like.

The register files RF1 to RF12 of the NPU 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

Figure 7:
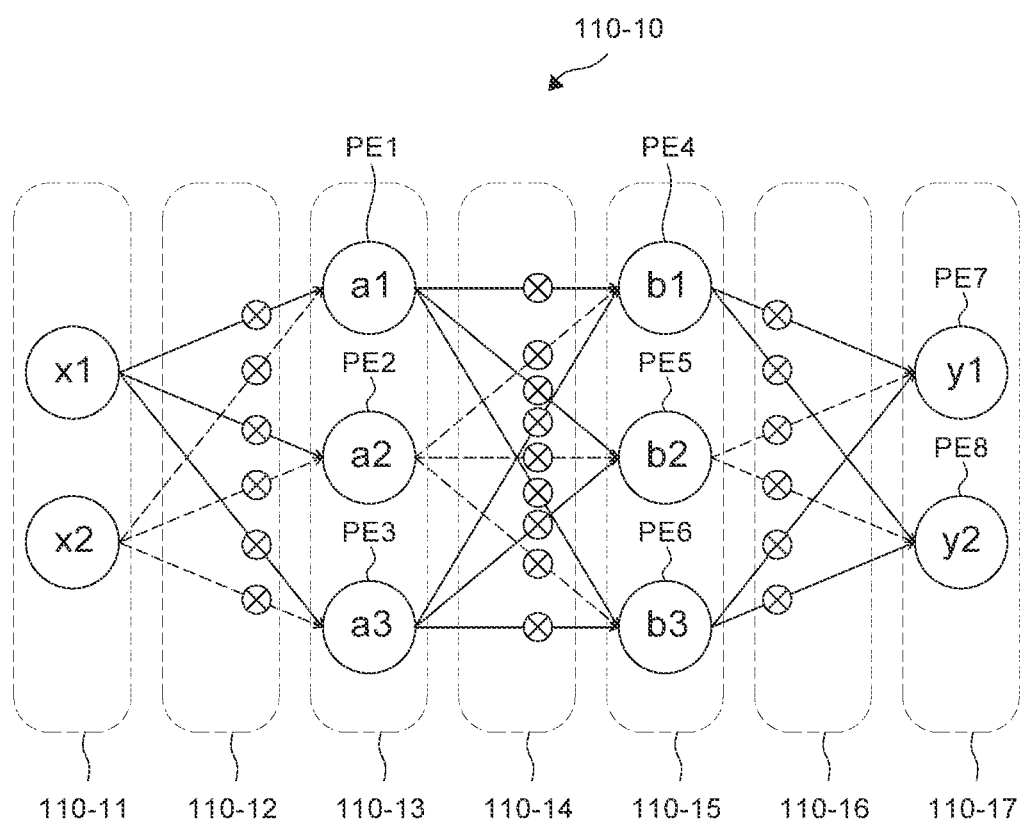
FIG. 7 is a schematic conceptual diagram illustrating an exemplary artificial neural network model.

FIG. 7 is a schematic conceptual diagram illustrating an exemplary artificial neural network model.

Hereinafter, an operation of an exemplary artificial neural network model 110-10 which may operate in the NPU 100 will be explained.

The exemplary artificial neural network models 110-10 of FIG. 7 may be artificial neural networks trained on the NPU 100 shown in FIG. 4 or 6, or trained on a separate machine learning device. The artificial neural network models may be artificial neural networks trained to perform various inference functions, such as object detection, speech recognition, and the like.

The artificial neural network model 110-10 may be a deep neural network (DNN).

However, the artificial neural network model 110-10 according to the examples of the present disclosure is not limited to the deep neural network.

For example, the artificial neural network model may be a trained model to perform inference such as object detection, object segmentation, image/video reconstruction, image/video enhancement, object tracking, event recognition, event prediction, anomaly detection, density estimation, event search, measurement, and the like.

For example, the artificial neural network model may be a model of Bisenet, Shelfnet, Alexnet, Densenet, Efficientnet, EfficientDet, Googlenet, Mnasnet, Mobilenet, Resnet, Shufflenet, Squeezenet, VGG, Yolo, RNN, CNN, DBN, RBM, LSTM, and the like. For example, an artificial neural network model may be a generative adversarial networks (GAN), a transformer, and the like. However, this disclosure is not limited to such models, and new neural network models for operating on NPUs are constantly being disclosed.

However, the present disclosure is not limited to the models described above. In addition, the artificial neural network model 110-10 may be an ensemble model based on at least two different models.

The artificial neural network model 110-10 may be stored in the NPU internal memory 120 of the NPU 100.

Referring to FIG. 7, an inference process for an exemplary artificial neural network model 110-10 will be described as being performed by the NPU 100.

The artificial neural network model 110-10 may be an example of a deep neural network model including an input layer 110-11, a first connection network 110-12, a first hidden layer 110-13, a second connection network 110-14, a second hidden layer 110-15, a third connection network 110-16, and an output layer 110-17. However, the present disclosure is not limited only to the artificial neural network model illustrated in FIG. 7. The first hidden layer 110-13 and the second hidden layer 110-15 may also be referred to as a plurality of hidden layers.

The input layers 110-11 may include, for example, x1 and x2 input nodes, that is, the input layers 110-11 may include information about two input values. A scheduler in the NPU controller 130 illustrated in FIG. 4 or 6 may set a memory address in the NPU internal memory 120 illustrated in FIG. 4 or 6 in which information about input values of the input layers 110-11 is stored.

The first connectivity network 110-12 may include information about six weight values for connecting each node of the input layer 110-11 to each node of the first covert layer 110-13, for example. A scheduler in the NPU controller 130 shown in FIG. 4 or 6 may set a memory address in the NPU internal memory 120 in which information about the weighting values of the first connectivity network 110-12 is stored. Each weight value is multiplied with the input node value, and the accumulated value of the multiplied values is stored in the first hidden layer 110-13. The nodes may be referred to as feature maps.

The first hidden layer 110-13 may exemplarily include a1, a2, and a3 nodes, that is, the first hidden layer 110-13 may include information about three node values. A scheduler in the NPU controller 130 shown in FIG. 4 or FIG. 6 may set a memory address in the NPU internal memory 120 for storing information about the node values of the first hidden layer 110-13.

The scheduler in the NPU controller 130 may be configured to schedule an order of operations for the first processing element PE1 to perform the MAC operation of the a1 node of the first hidden layer 110-13. The scheduler in the NPU controller 130 may be configured to schedule an order of operations for the second processing element PE2 to perform the MAC operations of the a2 node of the first hidden layer 110-13. The scheduler in the NPU controller 130 may be configured to schedule an order of operations for the third processing element PE3 to perform the MAC operation of the a3 node of the first hidden layer 110-13. Here, the scheduler in the NPU controller 130 may pre-schedule the order of operations such that the three processing elements each perform the MAC operations in parallel and simultaneously.

The second connection network 110-14 may exemplarily include information about nine weight values for connecting each node of the first hidden layer 110-13 to each node of the second hidden layer 110-15. A scheduler in the NPU controller 130 shown in FIG. 4 or 6 may set a memory address in the NPU internal memory 120 for storing information about the weight values of the second connection network 110-14. The weight values of the second connection network 110-14 are each multiplied with the node values input from the first hidden layer 110-13, and the accumulated values of the multiplied values are stored in the second hidden layer 110-15.

The second hidden layer 110-15 may exemplarily include nodes b1, b2, and b3, that is, the second hidden layer 110-15 may include information about three node values. A scheduler in the NPU controller 130 may set a memory address in the NPU internal memory 120 for storing information about the node values of the second hidden layer 110-15.

The scheduler in the NPU controller 130 may be configured to schedule an order of operations for the fourth processing element PE4 to perform the MAC operation of node b1 of the second hidden layer 110-15. The scheduler in the NPU controller 130 may be configured to schedule an order of operations for the fifth processing element PE5 to perform the MAC operation of the b2 node of the second hidden layer 110-15. The scheduler in the NPU controller 130 may be configured to schedule an order of operations for the sixth processing element PE6 to perform the MAC operations of the b3 node of the second hidden layer 110-15.

Here, the scheduler in the NPU controller 130 may pre-schedule the order of operations so that the three processing elements each perform a MAC operation in parallel.

Here, the scheduler in the NPU controller 130 may determine the scheduling such that the computation of the second hidden layer 110-15 is performed after the MAC computation of the first hidden layer 110-13 of the artificial neural network model.

That is, the scheduler in the NPU controller 130 may be configured to control the plurality of processing elements 100 and the NPU internal memory 120 based on information about data locality or structure of the artificial neural network model.

The third connection network 110-16 may include, for example, information about six weight values that connect each node of the second hidden layer 110-15 with each node of the output layer 110-17. A scheduler in the NPU controller 130 may set a memory address in the NPU internal memory 120 for storing information about the weight values of the third connection network 110-16. The weight values of the third connection network 110-16 are each multiplied with the node values input from the second hidden layer 110-15, and the accumulated values of the multiplied values are stored in the output layer 110-17.

Output layer 110-17 may exemplarily include nodes y1, and y2, that is, output layer 110-17 may include information about two node values. A scheduler in the NPU controller 130 may set a memory address in the NPU internal memory 120 to store information about the node values of the output layer 110-17.

The scheduler in the NPU controller 130 may be configured to schedule the order of operations such that the seventh processing element PE7 performs the MAC operation of the y1 node of the output layer 110-17. The scheduler in the NPU controller 130 may be configured to schedule the order of operations such that the eighth processing element PE8 performs the MAC operation of the y2 node of the output layer 110-15.

Here, the scheduler in the NPU controller 130 may pre-schedule the order of operations so that the two processing elements perform their respective MAC operations in parallel.

Here, the scheduler in the NPU controller 130 may determine the scheduling such that the computation of the output layer 110-17 is performed after the MAC computation of the second hidden layer 110-15 of the artificial neural network model.

That is, the scheduler in the NPU controller 130 may be configured to control the plurality of processing elements 100 and the NPU internal memory 120 based on information about data locality or structure of the artificial neural network model.

That is, the scheduler in the NPU controller 130 may analyze the structure of the artificial neural network model to be operated on the plurality of processing elements 100, or may be provided with the analyzed information. The information of the artificial neural network may include information about the values of the nodes in each layer, information about the batch data locality or the structure of the layers, and information about the weight values of each of the connections connecting the nodes in each layer.

Since the scheduler in the NPU controller 130 has been provided information about the data locality information or structure of the exemplary artificial neural network model 110-10, the scheduler in the NPU controller 130 can determine the order of operations from input to output of the artificial neural network model 110-10.

Thus, the scheduler in the NPU controller 130 may set the memory addresses where the MAC operation values of each layer are stored in the NPU internal memory 120, in consideration of the scheduling order.

The NPU internal memory 120 may be configured to preserve the weight data of the connection networks stored in the NPU internal memory 120 for the duration of the inference operation of the NPU 100. This may have the effect of reducing memory read-write operations.

That is, the NPU internal memory 120 may be configured to reuse MAC operation values stored in the NPU internal memory 120 for as long as the inference operation lasts.

Figure 8A:
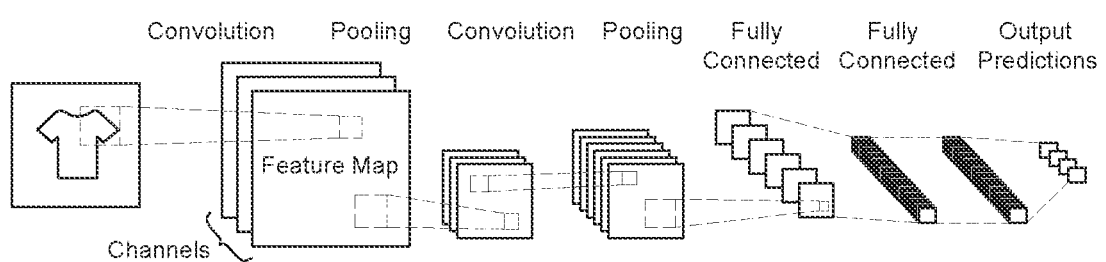
FIG. 8A is a drawing to illustrate a basic structure of a convolutional neural network.

FIG. 8A is a drawing to illustrate a basic structure of a convolutional neural network.

Referring to FIG. 8A, the convolutional neural network may be a combination of one or more convolutional layers, a pooling layer, and a fully connected layer.

In the examples of the present disclosure, a convolutional neural network has a kernel for each channel that extracts features from the input image of the channel. The kernel may be organized as a two-dimensional matrix and performs convolutional operations as it traverses the input data. The size of the kernel can be arbitrary, as are the strides at which the kernel traverses the input data. The convolutional result over the entire input data per kernel may be referred to as a feature map or an activation map. In the following, a kernel may include a single set of weight values or multiple sets of weight values. The number of kernels for each layer may be referred to as the number of channels. A kernel may be referred to as a matrix of weights, or a kernel may be referred to as a weight. Hereinafter, an activation map is described as being a part of a feature map. Thus, an activation map according to an example of the present disclosure may be referred to as a feature map.

Since the convolutional operation is a combination of the input data and the kernel, an activation function can then be applied to add nonlinearity. When an activation function is applied to a feature map resulting from a convolutional operation, it can be referred to as an activation map.

Specifically, referring to FIG. 8A, the convolutional neural network includes at least one convolutional layer, at least one pooling layer, and at least one fully connected layer.

For example, a convolution can be defined by two main parameters: the size of the input data (typically a 1×1, 3×3, or 5×5 matrix) and the depth (number of kernels) of the output feature map. These key parameters can be computed by convolution. These convolutions can start at a depth of 32, continue to a depth of 64, and terminate at a depth of 128 or 256. A convolutional operation can mean sliding a kernel of size 3×3 or 5×5 over the input data, the input image matrix, multiplying each weight of the kernel by each element of the overlapping input image matrix, and then adding them all together.

The activation function can then be applied to the output feature map to finally output an activation map. In addition, the weights used in the current layer can be passed to the next layer using convolution. The pooling layer can perform a pooling operation that reduces the size of the feature map by down-sampling the output data (i.e., the activation map). For example, the pooling operation may include, but is not limited to, max pooling and/or average pooling.

The max pooling operation uses the kernel and outputs the maximum value in the region of the feature map where the feature map and kernel slide to overlap the kernel. The average pooling operation uses an average value within the region of the feature map where the feature map and kernel slide to overlap the kernel. Since these pooling operations reduce the size of the feature map, they also reduce the number of weights in the feature map.

The fully connected layer can classify the data output from the pooling layer into a plurality of classes (i.e., estimates) and output the classified classes and their scores. The data output from the pooling layer is in the form of a three-dimensional feature map, which can be converted to a one-dimensional vector and input to the fully connected layer.

Figure 8B:
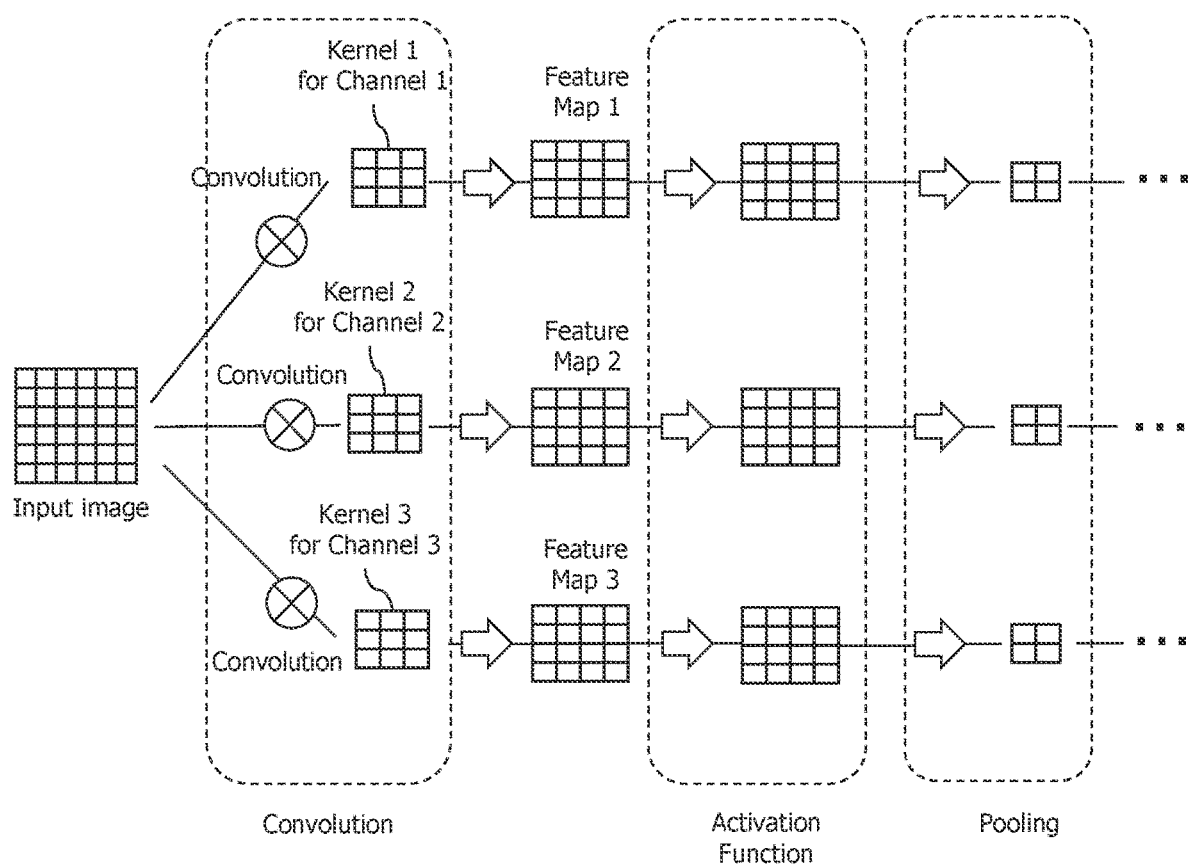
FIG. 8B is a composite diagram illustrating the operation of a convolutional neural network.

FIG. 8B is a composite diagram illustrating the operation of a convolutional neural network.

Referring to FIG. 8B, it is shown that an exemplary input image is a two-dimensional matrix having a size of 6×6. It is also shown in FIG. 8B that an exemplary three channels are used, namely channel 1, channel 2, and channel 3.

First, the convolutional operation will be described.

The input image (exemplarily illustrated in FIG. 8B as being 6×6 in size) is convolved with kernel 1 (exemplarily illustrated in FIG. 8B as being 3×3 in size) for channel 1 at the first node. The result is output as feature map 1 (exemplarily shown in FIG. 8B as being 4×4 in size).

Further, the input image (exemplarily represented in FIG. 8B as being 6×6 in size) is convolved with the kernel 2 (exemplarily represented in FIG. 8B as being 3×3 in size) for channel 2 at the second node. The result is output as feature map 2 (exemplarily shown in FIG. 8B as being 4×4 in size).

Further, the input image is convolved with a kernel 3 (exemplarily shown in FIG. 8B as being 3×3 in size) for channel 3 at the third node. As a result, a feature map 3 (exemplarily shown in FIG. 8B as being 4×4 in size) is output.

To process each convolution, the processing elements PE1 to PE12 of the NPU 100 are configured to perform MAC operations.

Next, the behavior of the activation function will be described.

The activation function may be applied to feature map 1, feature map 2, and feature map 3 (each of which is shown in FIG. 8B as having an exemplary size of 4×4) that are output from the convolutional operation. The output after the activation function is applied may exemplarily be of size 4×4.

Next, the pooling operations will be described.

The feature map 1, feature map 2, and feature map 3 (each of which is shown in FIG. 8B as having an exemplary size of 4×4) output from the above activation function are input to the three nodes. Pooling can be performed by taking the feature maps output from the activation function as input. Pooling can be done to reduce the size or to emphasize certain values in the matrix. Pooling methods include maximum value pooling, average pooling, and minimum value pooling. Maximum value pooling is used to collect the maximum number of values in a certain region of the matrix, while average pooling can be used to find the average value within a certain region.

The example in FIG. 8B shows a 4×4 feature map being reduced to a 2×2 size by pooling.

Specifically, the first node receives as input the feature map 1 for channel 1, performs a pooling and outputs, for example, a 2×2 matrix. The second node receives as input the feature map 2 for channel 2, performs a pooling and outputs, for example, a 2×2 matrix. The third node receives as input the feature map 3 for channel 3, performs the pooling, and outputs, for example, a 2×2 matrix.

The aforementioned convolution, activation function, and pooling are repeated, and finally, the output may finally be fully connected as shown in FIG. 8A. This output can be input to an artificial neural network for image recognition. However, the present disclosure is not limited to the size of the feature map or kernel.

Video Coding for Machines (VCM)

Recently, with the development of various industrial fields such as surveillance, intelligent transportation, smart city, intelligent industry, and intelligent Content, the amount of image or feature map data consumed by machines is increasing. On the other hand, the traditional image compression method currently in use is a technology developed in consideration of the characteristics of human vision perceived by the viewer and contains unnecessary information, making it inefficient in performing machine tasks. Therefore, there is a demand for a study on a video codec technology for efficiently compressing a feature map for performing a machine task.

Video coding for machine (VCM) technology is being discussed in the moving picture experts group (MPEG), an international standardization group for multimedia encoding. VCM is an image or feature map encoding technology that is based on the machine vision, not the viewer's point of view.

Descriptions of the Example of the Present Disclosure

FIGS. 9A to 9D are exemplary diagrams depicting an NPU including a VCM encoder and an NPU including a VCM decoder.

Figure 9A:
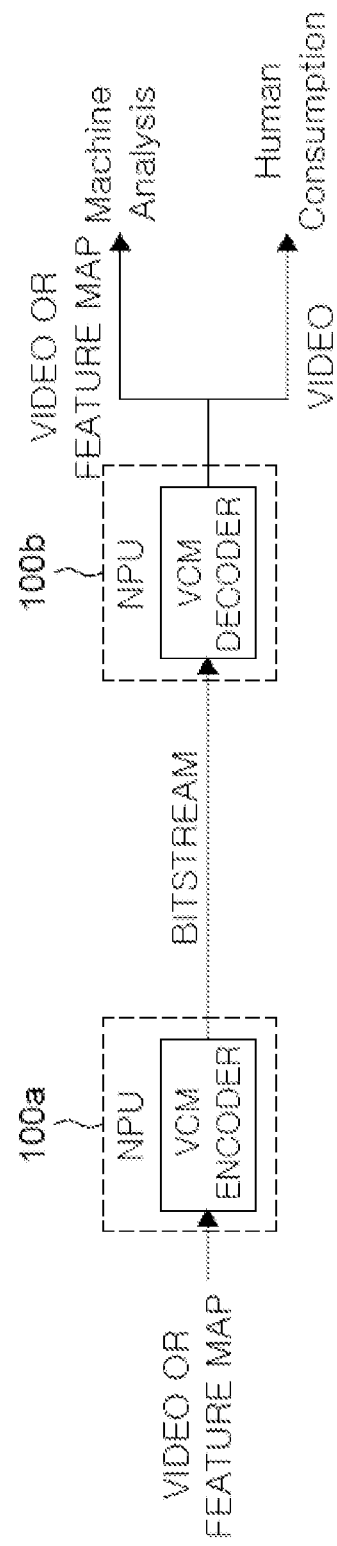

Referring to FIG. 9A, the first NPU 100a may include a VCM encoder 150a, and the second NPU 100b may include a VCM decoder 150b.

Once the VCM encoder 150a in the first NPU 100a encodes the video and/or feature map and transmits it as a bitstream, the VCM decoder 150b in the second NPU 100b may decode and output the bitstream. At this time, the VCM decoder 150b in the second NPU 100b may output one or more videos and/or feature maps. For example, the VCM decoder 150b in the second NPU 100b may output a first feature map for machine analysis, and may output a first video for viewing by a user. The first video may be at a higher resolution compared to the first feature map.

Here, the first NPU 100a may output a feature map that is calculated in a distributed manner up to a particular layer (e.g., a first to 12th layer) of the particular artificial neural network model, and encode the feature map into a bitstream via the VCM encoder 150a.

The second NPU 100b may then decode the bitstream with the VCM decoder 150b and output the feature map distributed over the remaining specific layers of the specific artificial neural network model (e.g., the 13th to 28th layer).

Figure 9B:
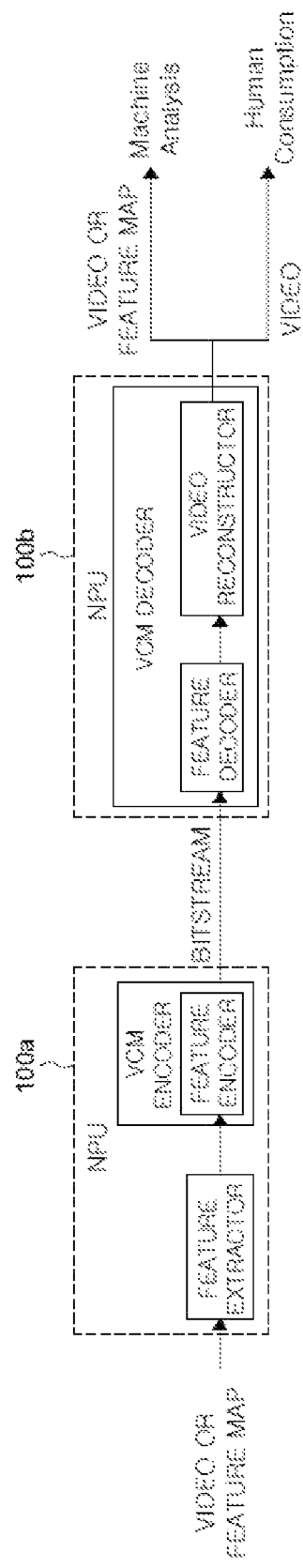

Referring to FIG. 9B, the first NPU 100*a* may include a feature extractor to extract a feature map and a VCM encoder 150*a*.

The VCM encoder 150*a* in the first NPU 100*a* may include a feature encoder. The second NPU 100*b* may include a VCM decoder 150*b*. The VCM decoder 150*b* in the second NPU 100*b* may include a feature decoder and a video reconstructor. The feature decoder may decode a feature map from the bitstream and output a first feature map for machine analysis. The video reconstructor may reconstruct and output a first video for viewing by a user from the bitstream.

Here, the first NPU 100*a* may output a feature map computed in a distributed manner over particular layers (e.g., first to 12th layers) of a particular artificial neural network model, and encode the feature map as a bitstream via the VCM encoder 150*a*. Here, the feature extractor may extract and encode specific features separately.

Here, the second NPU 100*b* may decode the bitstream with a VCM decoder 150*b* and output a feature map that is computed in a distributed manner over the remaining specific layers of the specific artificial neural network model (e.g., layers from the 13th to the 28th). Here, the feature decoder may decode specific features.

Referring to FIG. 9C, the first NPU 100*a* may include a feature extractor to extract a feature map and a VCM encoder 150*a*.

The VCM encoder 150*a* in the first NPU 100*a* may include a feature encoder. The second NPU 100*b* may include a VCM decoder 150*b*. The VCM decoder 150*b* in the second NPU 100*b* may include a feature decoder. The feature decoder may decode a feature map from the bitstream and output a first feature map for machine analysis. That is, the bitstream may be encoded only as a feature map and not as an image. The feature map may be data including information about features for processing a particular task of the machine based on the image.

Here, the first NPU 100*a* may output a feature map computed with a distributed computation up to a particular layer (e.g., first to 12th layer) of a particular artificial neural network model, and encode the feature map as a bitstream via the VCM encoder 150*a*. Here, the feature extractor may extract and encode specific features separately.

Here, the second NPU 100*b* may decode the bitstream by the VCM decoder 150*b* and output a feature map computed with a distributed computation up to the remaining particular layers of the particular artificial neural network model (e.g., layers from the 13th to the 28th). Here, the feature decoder may decode specific features.

Figure 9D:
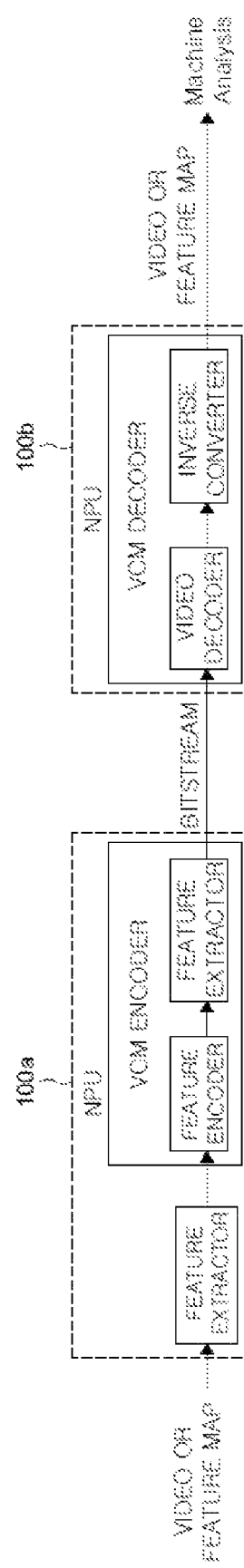

Referring to FIG. 9D, the first NPU 100*a* may include a feature extractor to extract a feature map and a VCM encoder 150*a*.

The VCM encoder 150*a* in the first NPU 100*a* may include a feature converter and a video encoder. The second NPU 100*b* may include a VCM decoder 150*b*. The VCM decoder 150*b* in the second NPU 100*b* may include a video decoder and an inverse converter.

Here, the first NPU 100*a* may output a feature map computed in a distributed manner up to a particular layer (e.g., first to 12th layer) of a particular artificial neural network model, and encode the feature map into a bitstream via the VCM encoder 150*a*. Here, the feature extractor may extract and encode specific features separately.

Here, the second NPU 100*b* may decode the bitstream with the VCM decoder 150*b* and output a feature map that is computed in a distributed manner over the remaining particular layers of the particular artificial neural network model (e.g., layers from the 13th to the 28th).

The feature extractors shown in FIGS. 9B to 9D may correspond to the plurality of PEs 110 in the NPU 100 shown in FIG. 4 or 6. Alternatively, the feature extractor shown in FIGS. 9B to 9D may correspond to a combination of the plurality of PEs 110 in the NPU 100 and the SFUs as described above.

As shown in FIGS. 9A to 9D, the first NPU 100*a* is illustrated as including at least one VCM encoder 150*a*, and the second NPU 100*b* is illustrated as including at least one VCM decoder 150*b*. However, without limitation, the VCM encoder 150*a* may be modified to include the first NPU 100*a* and/or the VCM decoder 150*b* may be modified to include the second NPU 100*b*.

The first NPU 100*a* may process an artificial intelligence operation (e.g., convolution) to generate a feature map of a particular layer. The first NPU 100*a* may process the artificial intelligence operation to encode the feature map of the particular layer and then transmit it. However, without limitation, the first NPU 100*a* may also encode and transmit the weight of the particular layer.

The second NPU 100*b* may receive the encoded feature map of the particular layer. The second NPU 100*b* may process an artificial intelligence operation (e.g., deconvolution) to decode the feature map of the particular encoded layer. However, without limitation, the second NPU 100*b* may also decode the weights of the particular encoded layer.

To perform artificial intelligence computations, an artificial neural network model with a particular structure may be used. For example, to extract a feature map of a particular layer, the NPU may perform a convolutional operation. For example, to encode a feature map of a particular layer, the NPU may perform a convolutional operation. For example, to decode a feature map of a particular layer that has been encoded, the NPU may perform a deconvolution operation.

The artificial neural network model may be a multi-layer structure, and the artificial neural network model may include a backbone network. The feature map generated by the artificial intelligence computation of the first NPU 100*a* may be a feature map generated from a particular layer of the multi-layer artificial neural network model. That is, the feature map may be at least one feature map generated from at least one layer of the multi-layer artificial neural network model. A feature map generated from a particular layer of a multi-layer artificial neural network model may be a feature map suitable for analyzing artificial intelligence using a particular machine.

Figure 10A:
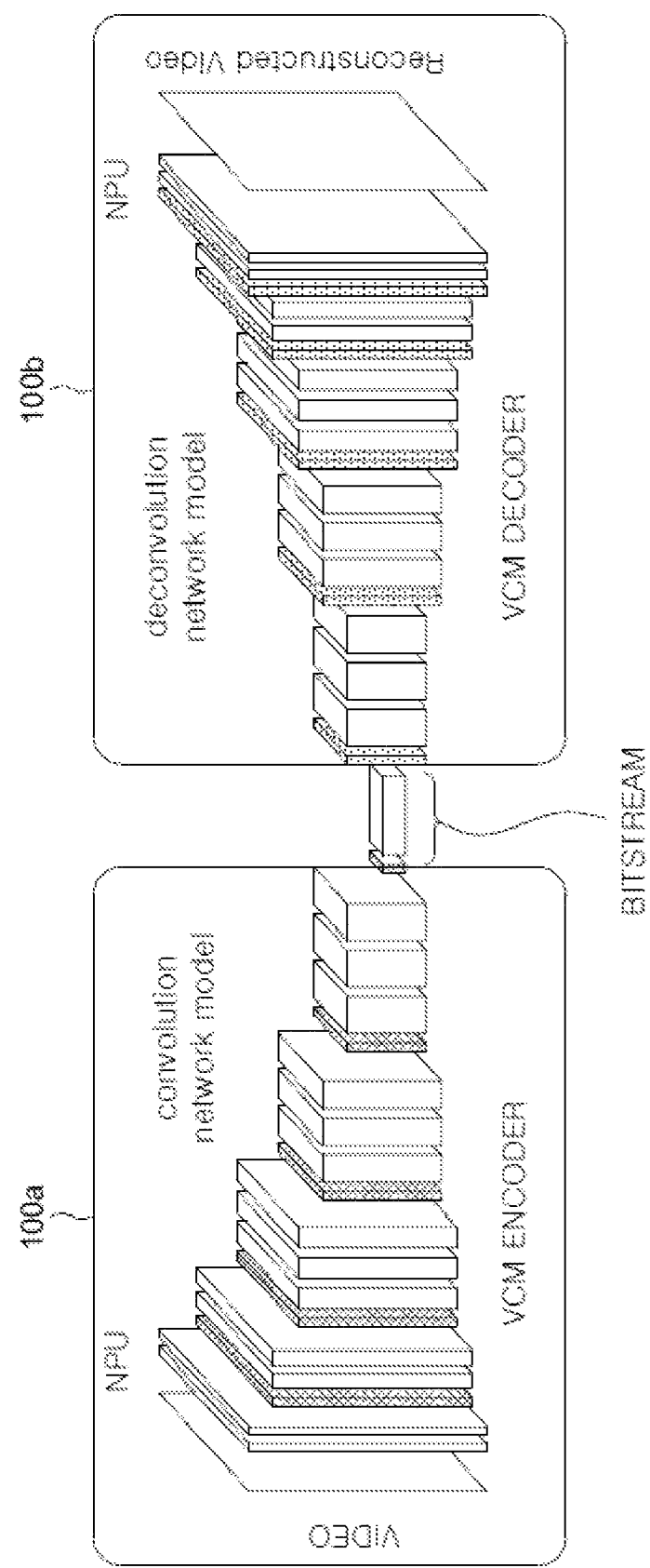
FIGS. 10A and 10B are example diagrams illustrating locations of bitstreams in an artificial neural network model.
Figure 10B:
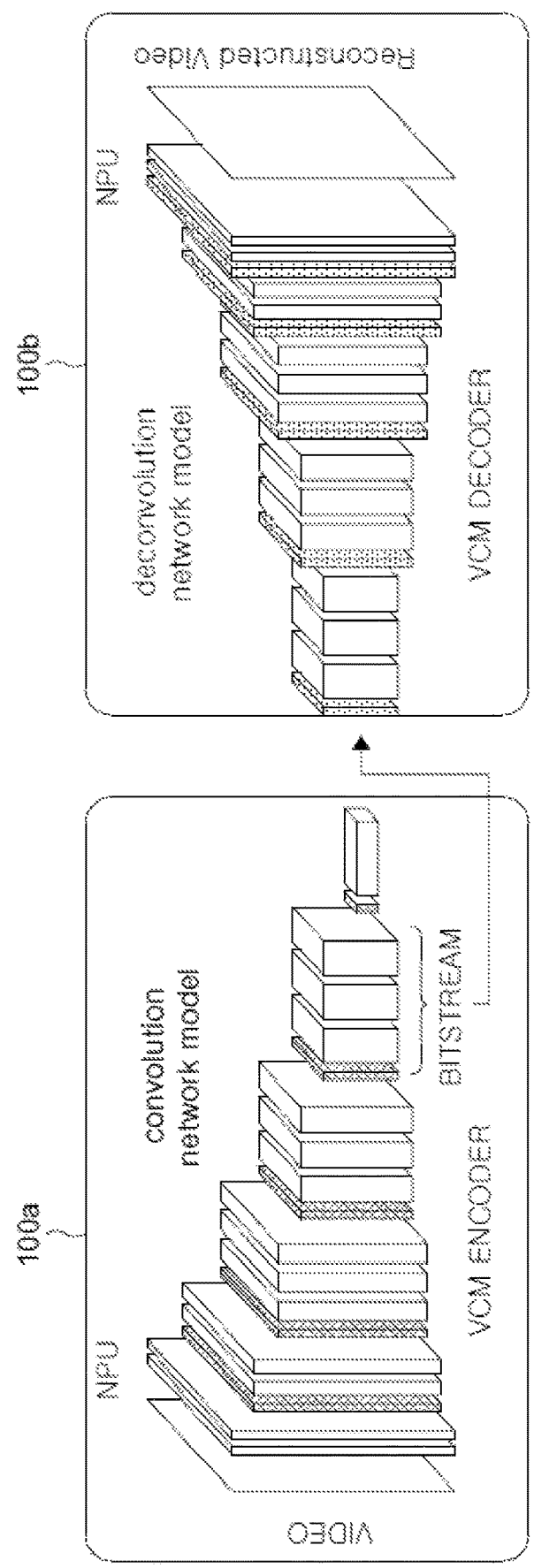

FIGS. 10A and 10B are example diagrams illustrating locations of bitstreams in an artificial neural network model.

As can be seen with reference to FIG. 10A, when the first NPU 100*a* or VCM encoder receives video input, it can generate feature maps for each layer using an artificial neural network model (e.g., a convolutional network model). In FIG. 10A, an example of transmitting a feature map from a fully connected layer, which corresponds to the last layer of a convolutional network model, as a bitstream is shown.

Then, the second NPU 100*b* or VCM decoder may decode the bitstream comprising the feature map using a deconvolutional network model.

Referring to FIG. 10B, an example is shown in which feature maps generated in an intermediate layer of an artificial neural network model (e.g., a convolutional network model) are transmitted as bitstreams, rather than feature maps from a fully connected layer.

Figure 11A:
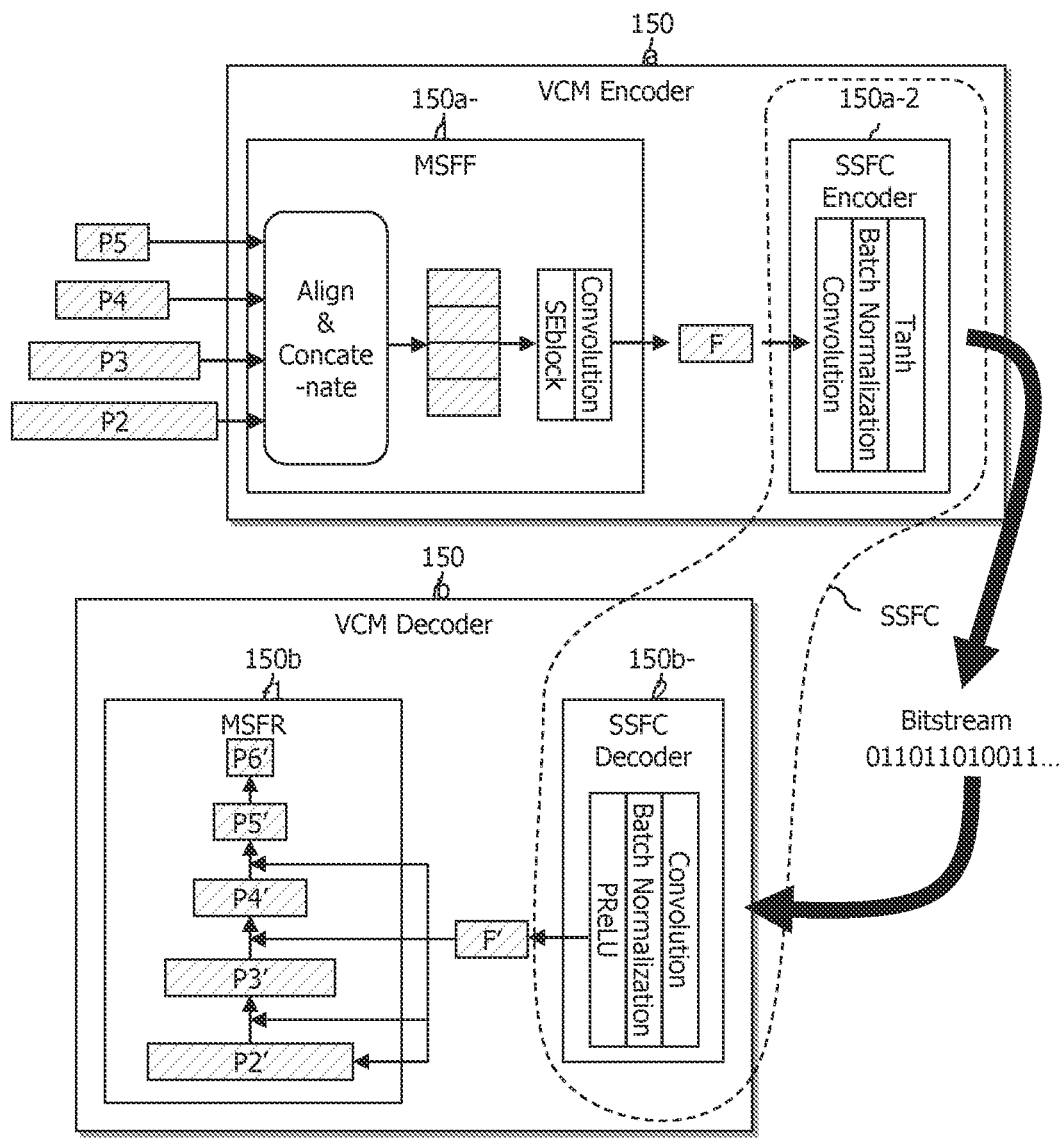
FIG. 11A is an illustration of an example VCM encoder that compresses a feature map to transmit a bitstream and a VCM decoder that reconstructs the received bitstream.
Figure 11B:
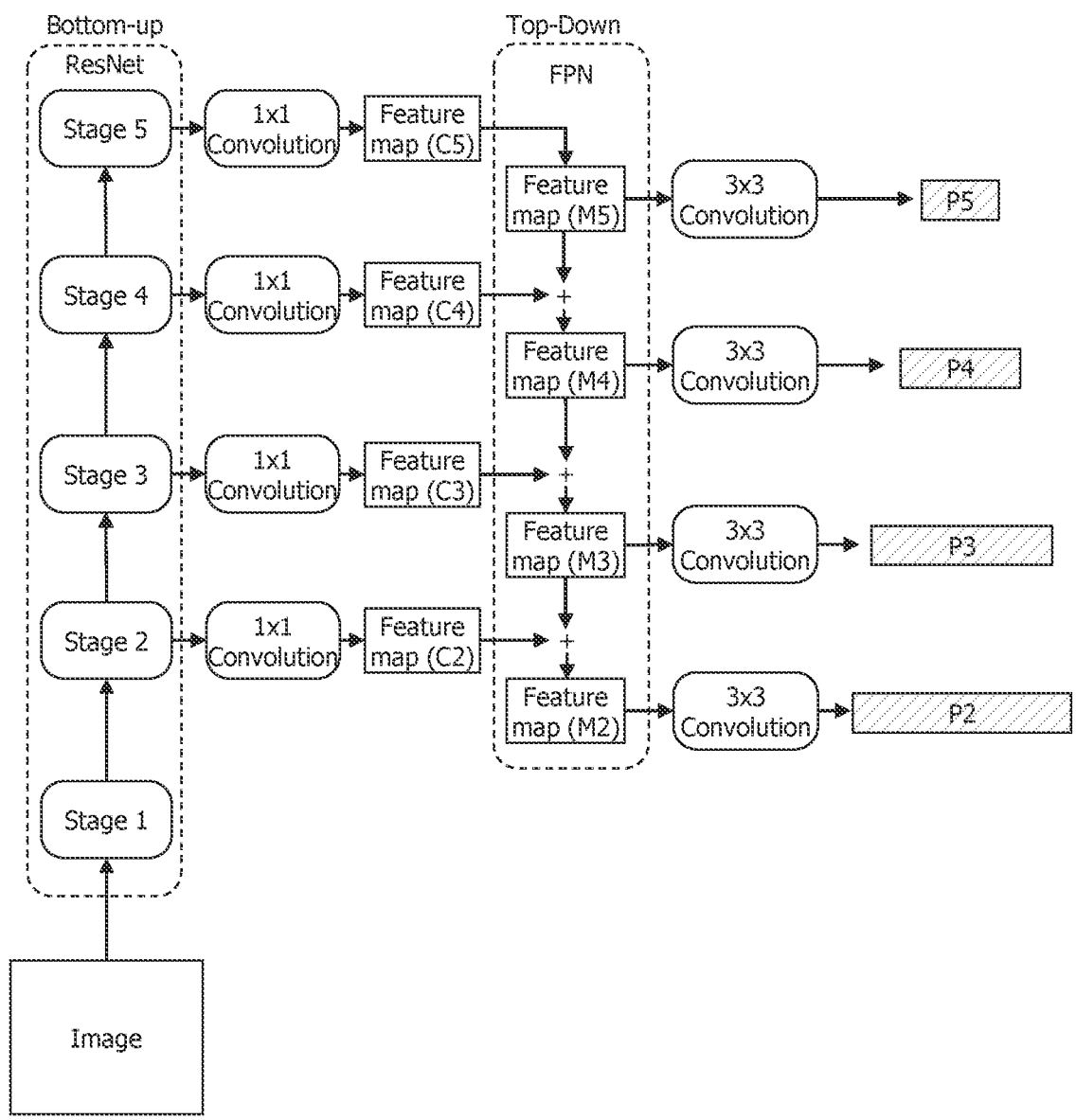
FIG. 11B illustrates an example of generating feature map P2 to feature map P5 shown in FIG. 11A.
Figure 11C:
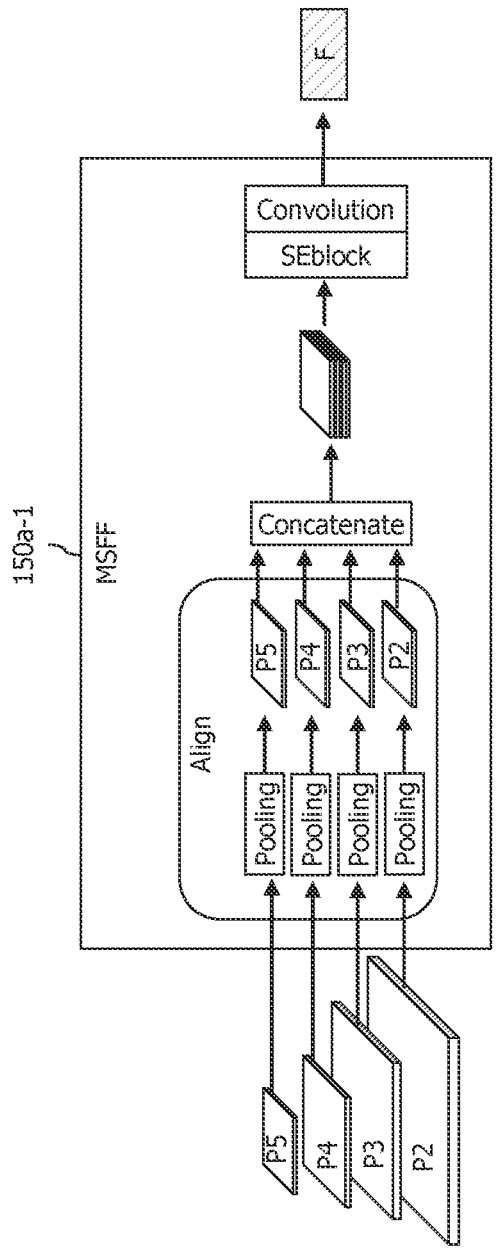
FIG. 11C is an illustration of an example of performing the MSFF shown in FIG. 11A in detail.

FIG. 11A illustrates a VCM encoder that compresses a feature map and transmits it as a bitstream, and a VCM decoder that reconstructs the received bitstream, according to one example. FIG. 11B illustrates an example of generating feature map P2 to feature map P5 shown in FIG. 11A. FIG. 11C is an illustration of an example of performing the MSFF shown in FIG. 11A in detail.

As can be seen in FIG. 11A, the VCM encoder 150a (or transmitter) may include a multi-scale feature fusion (MSFF) performer 150a-1 and a single-stream feature codec (SSFC) encoder 150a-2. The VCM decoder 150b (or receiver side) may include an SSFC decoder 150b-1 and a multi-scale feature reconstruction (MSFR) performer 150b-2.

The MSFF performer 150a-1 aligns the feature map P2 and the feature map P5 of the P layer, and then concatenates them. The feature map P2 and feature map P5 of the P layer may be generated as illustrated in FIG. 11B.

With reference to FIG. 11B, feature map P2 to feature map P5 may be generated using a combination of a first artificial neural network model, such as ResNet, and a second artificial neural network model, such as a feature pyramid network (FPN). The first artificial neural network model may be referred to as the backbone. The second artificial neural network model may be referred to as a neck or a head.

As shown in FIG. 11B, when an image is input, the first artificial neural network model (e.g., ResNet) may perform a number of steps (e.g., from Stage 1 to Stage 5) in a bottom-up manner. Each step may include, for example, convolution, batch normalization, rectified linear unit (ReLU), and the like.

A convolution may be performed on the output from each step of the first artificial neural network model (e.g., ResNet) to generate the feature map C2 to the feature map C5 of the C layer. The second artificial neural network model (e.g., FPN) may receive the feature map C2 to the feature map C5 of the C layer as input and accumulate them in a top-down manner to generate the feature map M2 to the feature map M5 of the M layer. By performing convolution on the feature map M2 and feature map M5 of the M layer, respectively, a feature map P2 and feature map P5 of the P layer may be generated.

Referring to FIG. 11A again, the MSFF performer 150a-1 aligns the feature map P2 and the feature map P5 of the P layer, and then concatenates them. Specifically, the MSFF performer 150a-1 down-samples the size of the feature map P2 to the feature map P4 to match the size of the feature map P5, and then concatenates them.

As further described with reference to FIG. 11C, the MSFF performer 150a-1 performs pooling on each of the feature map P2 and the feature map P5. By the pooling, each of the feature map P2 and the feature map P5 may be reduced to a certain size, such as a 64×64 size or a 32×32 size. Alternatively, based on feature map P5 having the smallest size among feature maps P2 and P5, the remaining feature maps (i.e., feature map P2, feature maps P3 and P4) can be made to have the same size. That is, pooling can be performed on each of the remaining feature maps (i.e., feature map P2, feature map P3 and P4) to make them equal to the size of feature map P5.

Then, the MSFF performer 150a-1 may concatenate the feature map P2 and the feature map P5. For example, if each of feature map P2 and feature map P5 is in the shape of a cube of size 64×64 with 256 channels, then, after concatenation, it may be in the shape of a cube of size 64×64 with 1024 channels.

The above concatenated feature maps can be transmitted through an SEblock.

Referring again to FIG. 11A, the SEBlock is a squeeze-and-excitation (SE) processing operation that calculates a channel-wise weight of the feature map and multiplies the weight to the output feature map of the residual unit. Further, the MSFF unit may perform a channel-wise reduction using convolution on the output of the SEBlock. The MSFF performer may finally pass the output F to the SSFC encoder 150a-2. Upon receiving the output F from the MSFF performer 150a-1, the SSFC encoder 150a-2 may transmit the bitstream after reducing the number of channels. For this purpose, the SSFC encoder 150a-2 may include a MAC circuit, a batch normalization circuit, and a Tanh function circuit.

The VCM decoder 150b (i.e., the receiver side) may include an MSFR performer 150b-1 and an SSFC decoder 150b-2. Upon receiving the bitstream, the SSFC decoder 150b-2 may generate an output F'. To this end, the SSFC decoder 150b-2 may include convolution, batch normalization, PReLu, and the like.

The MSFR performer 150b-1 of the VCM decoder 150b may reconstruct the feature map P2' to the feature map P5' of the P' layer from the output F' from the SSFC decoder 150b-2. For this purpose, the MSFR performer 150b-1 may perform up-sampling/down-sampling, accumulation, and the like.

Figure 12:
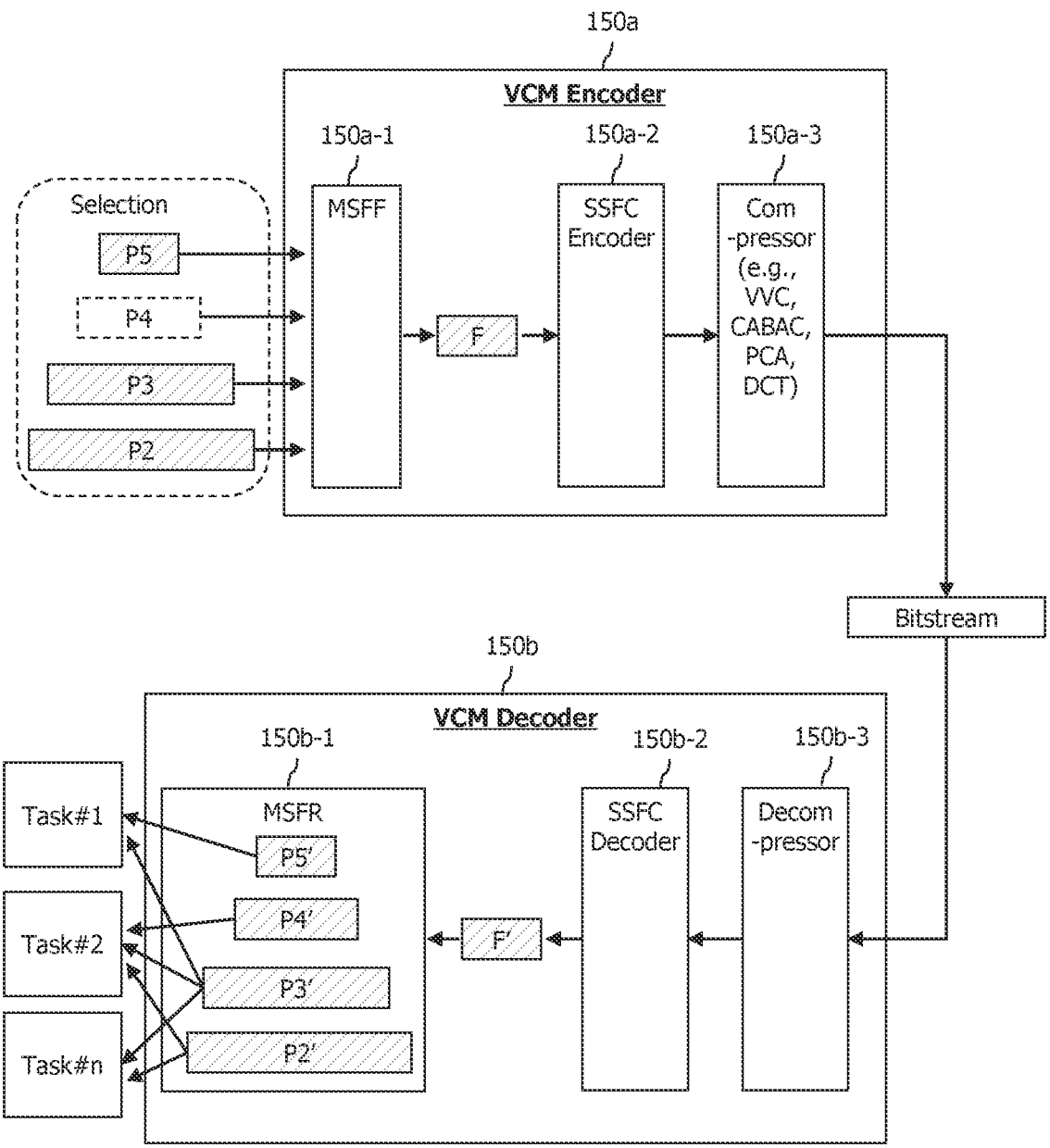
FIG. 12 is an exemplary diagram illustrating a modified example of FIG. 11A.

FIG. 12 is an exemplary diagram illustrating a modified example of FIG. 11A.

Hereinafter, only the description of the parts different from FIG. 11A will be described, and the same parts will not be described in a redundant manner, and the description of FIG. 11A will be incorporated by reference.

As can be seen with reference to FIG. 12, the VCM encoder 150a may further comprise a compressor 150a-3. The VCM decoder 150b may further include a decompressor 150b-3.

The MSFF performer 150a-1 of the VCM encoder 150a may optionally receive input from one or more of the plurality of feature maps extracted from the feature map extractor shown in FIGS. 9B to 9D. As a particular example, suppose that the feature map extractor shown in FIGS. 9B to 9D has extracted feature map P2 to feature map P5 as shown in FIG. 11B, then the MSFF performing part 150a-1 of the VCM encoder 150a may selectively receive input of one or more feature maps among said feature map P2 to feature map P5 as needed. In the example of FIG. 12, it is shown that the MSFF performer 150a-1 of the VCM encoder 150a optionally receives input of feature map P2, feature map P3, and feature map P5 among the feature maps P2 to P5.

The compressor 150a-3 in the VCM encoder 150a may compress the output from the SSFC encoder 150a-2. For said compression, the compressor 150a-3 in the VCM encoder 150a may perform versatile video coding (VVC) (or H.266), context-based adaptive binary arithmetic coding (CABAC), principal component analysis (PCA), discrete cosine transform (DCT), or the like. Alternatively, for said compression, the compressor 150a-3 within the VCM encoder 150a may utilize entropy coding techniques, among others.

By performing the above compression, the size of the transmitted bitstream can be significantly reduced, thus saving network bandwidth.

The decompressor 150b-3 of the VCM decoder 150b may decompress the received bitstream. For this purpose, the decompressor 150*b*-3 of the VCM decoder 150*b* may perform VVC (i.e., H.266), IDCT (inverse DCT), IPCA (inverse PCA), and the like.

The MSFR performer 150*b*-1 of the VCM decoder 150*b* may restore the feature map P2' to the feature map P5' from the output F' from the SSFC decoder 150*b*-2. Further, the MSFR performer 150*b*-1 of the VCM decoder 150*b* may pass one or more of the restored feature map P2' to the feature map P5' to each task. The tasks may include, for example, image classification, object detection, object tracking, object segmentation, and the like. That is, the MSFR performer 150*b*-1 of the VCM decoder 150*b* may pass one or more of the restored feature maps P2' to P5' to each task, such as passing feature map P5' to task #1, and passing feature map P2', feature map P3', and feature map P4' to task #2.

Figure 13A:
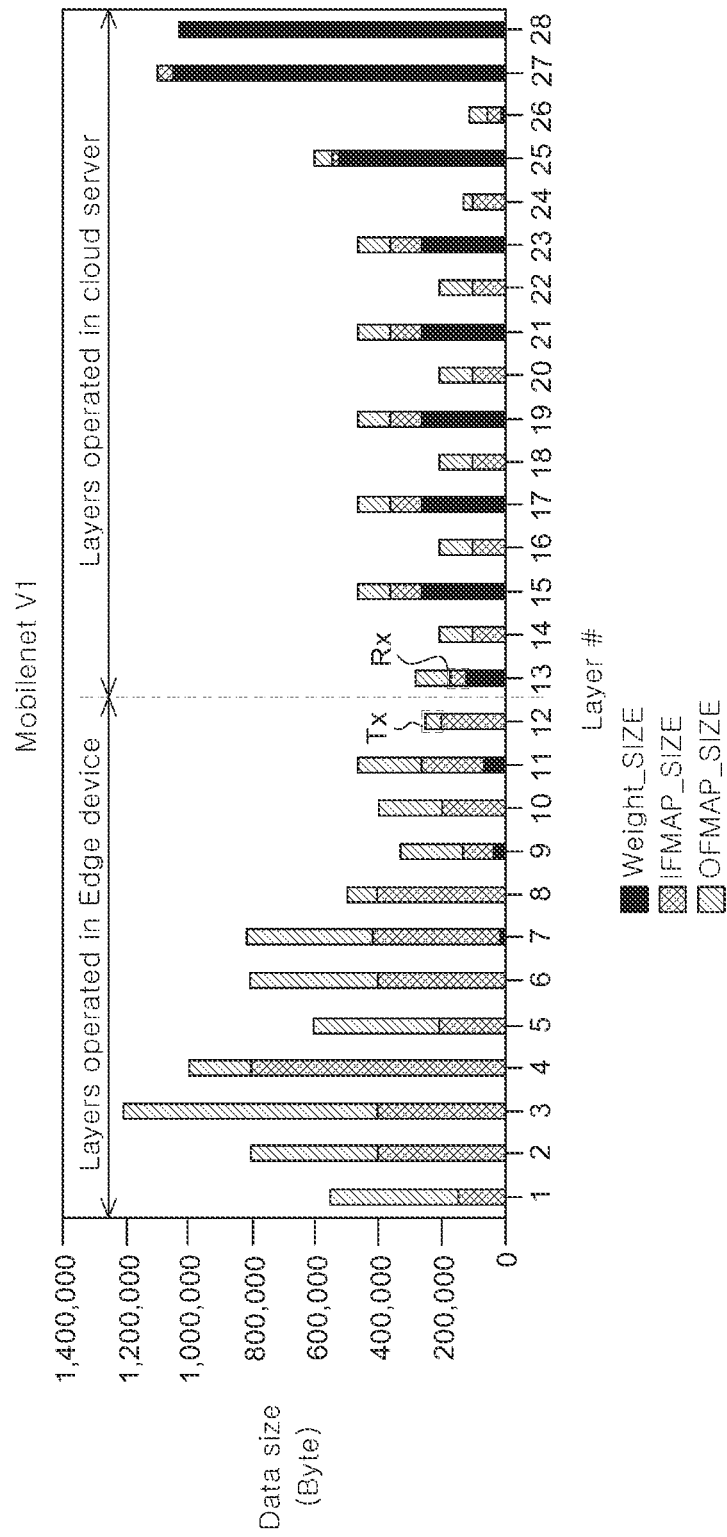
FIG. 13A is a conceptual diagram illustrating an example of distributed processing between an edge device and a cloud server, according to one example of the present disclosure, based on the size of data for each layer in an exemplary artificial neural network model.

FIG. 13A is a conceptual diagram illustrating an example of distributed processing between an edge device and a cloud server, according to one example of the present disclosure, based on the size of data for each layer in an exemplary artificial neural network model.

The exemplary artificial neural network model illustrated in FIG. 13A is shown as Mobilenet V1. Referring to FIG. 13A, the horizontal axis represents the layers in the exemplary artificial neural network model in order, and the vertical axis represents the size of the parameters of each layer. The parameters may refer to weights, input feature maps, and output feature maps.

Referring to the first layer shown in FIG. 13A and FIG. 13B, it can be seen that the size of the output feature map (OFMAP_SIZE) is larger than the size of the input feature map (IFMAP_SIZE).

However, referring to the 12th layer shown in FIGS. 13A and 13B, the size of the output feature map (OFMAP_SIZE) is 50,176 bytes (approximately 50 Kb), which is smaller than the size of the input feature map (IFMAP_SIZE) of 200,704 bytes, and the size of the output feature map (OFMAP_SIZE) of the 12th layer is also smaller than the size of the output feature maps of its adjacent layers both before and after.

In addition, the sum of the weights from the first layer to the 12th layer is very small, which is 133 Kb. The output feature map of the 12th layer is also very small, which is about 50 Kb.

Therefore, the NPU in each surveillance camera can transmit the output feature map of the 12th layer in the form of a bitstream. By transmitting such low size feature maps, even if the number of surveillance cameras increases significantly, the communication network will not be overloaded or congested.

Therefore, as shown in FIG. 13A, it may be considered to process the first layer to the 12th layer on the NPU of the edge terminal, and then transmit the output feature map of the 12th layer to the cloud server by means of wired or wireless transmission.

The NPU of the cloud server can use the received output feature map of the 12th layer as the input feature map of the 13th layer, and process the 13th layer to the 28th layer.

On the other hand, the output feature map of the 12th layer may be transmitted in the form of a bitstream through the MSFF performer 150*a*-1 and the SSFC encoder 150*a*-2, as shown in FIG. 11A. That is, the size of the output feature map of the 12th layer may be compressed through the MSFF performer 150*a*-1 and the SSFC encoder 150*a*-2 to be smaller.

In this way, by selecting and transmitting a smaller output feature map among the layers in the artificial neural network model, the computing load can be distributed while reducing network traffic. In other words, the transmission layer of the artificial neural network model that is distributed by the first NPU and the second NPU can be selected as the layer with the smallest parameter size or relatively small parameter size. Thus, the desired processing speed can be guaranteed even if the number of processing elements and internal memory capacity of the NPU for the edge are minimized.

Figure 14A:
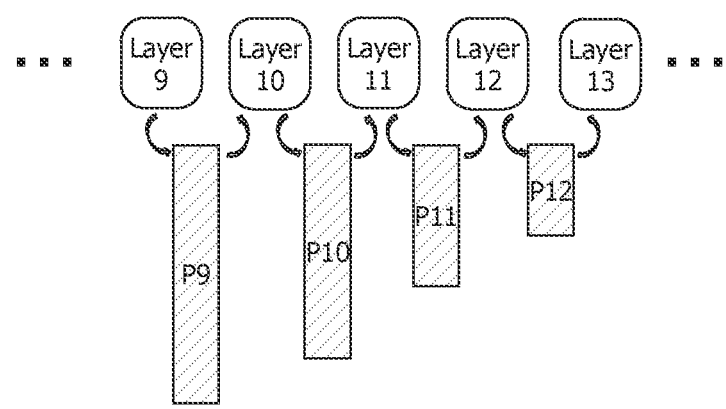
FIG. 14A is an exemplary diagram illustrating an exemplary feature map from layer 9 to layer 13 of the exemplary artificial neural network model shown in FIG. 13A.

FIG. 14A is an exemplary diagram illustrating an exemplary feature map from layer 9 to layer 13 of the exemplary artificial neural network model shown in FIG. 13A.

Referring to FIG. 14A, performing an arbitrary operation (e.g., a convolutional operation) on the 9th layer of the artificial neural network model shown in FIG. 13A outputs a feature map P9, and the feature map P9 is input to a 10th layer. When an arbitrary operation (e.g., a convolutional operation) is performed on the 10th layer, a feature map P10 is output, and the feature map P10 is input to the 11th layer. When an arbitrary operation (e.g., a convolutional operation) is performed on the 11th layer, the feature map P11 is output and input to the 12th layer. Similarly, when an arbitrary operation (e.g., a convolutional operation) is performed on the 12th layer, a feature map P12 is output, and the feature map P12 is input to the 13th layer.

Figure 14B:
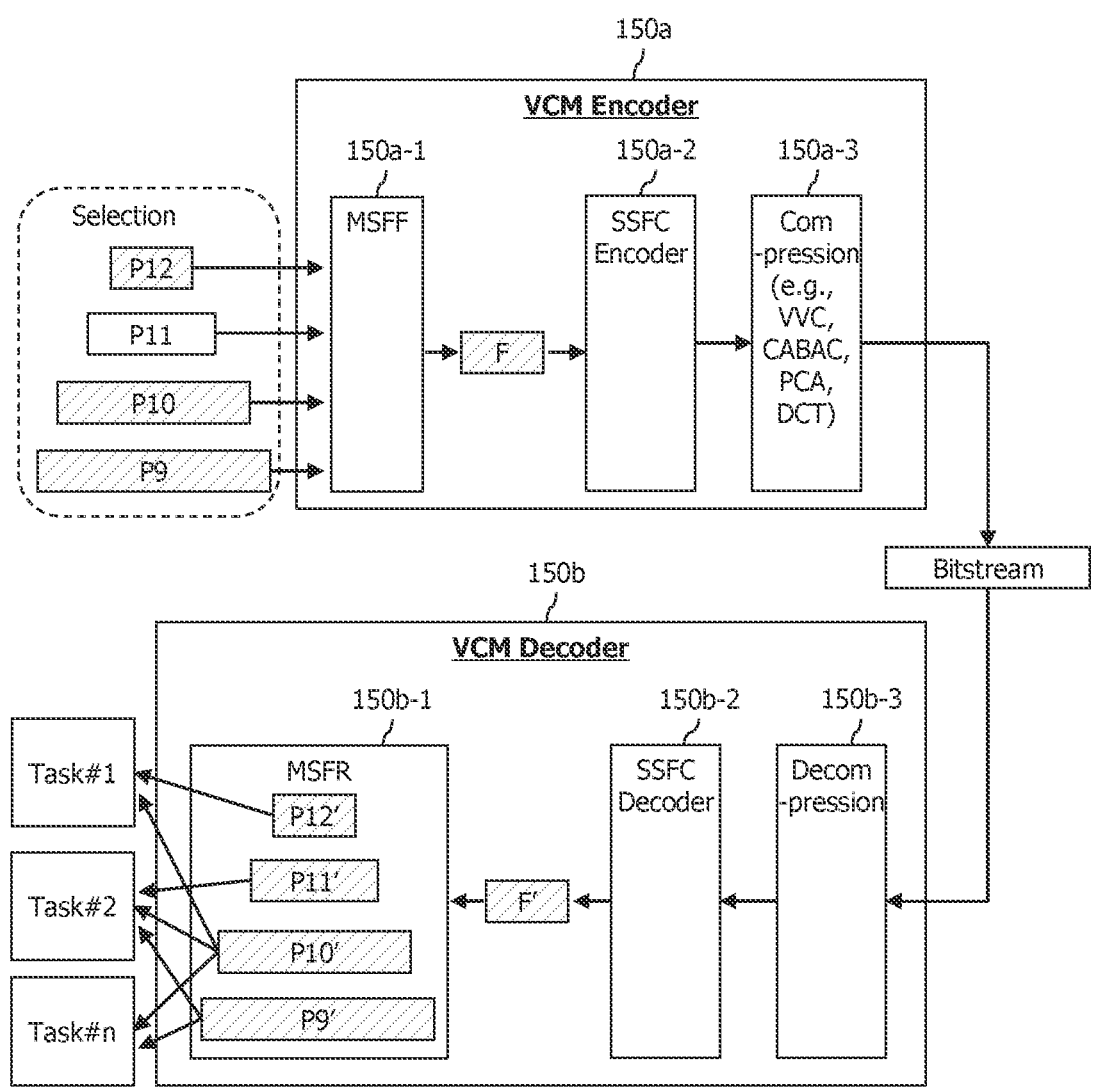
FIG. 14B is an exemplary diagram illustrating a VCM encoder that compresses the feature maps P9 through P12 shown in FIG. 14A and transmits them as a bitstream, and a VCM decoder that reconstructs the received bitstream, according to one example.

FIG. 14B is an exemplary diagram illustrating a VCM encoder that compresses the feature maps P9 through P12 shown in FIG. 14A and transmits them as a bitstream, and a VCM decoder that reconstructs the received bitstream, according to one example.

As can be seen with reference to FIG. 14B, the VCM encoder 150*a* (or the transmitter side) may include an MSFF performer 150*a*-1, an SSFC encoder 150*a*-2, and a compressor 150*a*-3. The VCM decoder 150*b* (or receiver side) may include a SSFC decoder 150*b*-1, a MSFR performer 150*b*-2, and a decompressor 150*b*-3. In the following, the description of FIGS. 11A and 12 will be incorporated by reference to FIGS. 11A and 12, with only those portions that differ from FIGS. 11A and 12 to be described, and without describing the redundant.

The MSFF performer 150*a*-1 of the VCM encoder 150*a* may optionally receive one or more of the plurality of feature maps extracted from the feature map extractor shown in FIGS. 9B to 9D. As a particular example, suppose that the feature map extractor shown in FIGS. 9B to 9D has extracted a feature map P9 to a feature map P12 as shown in FIG. 14A. Then, the MSFF performer 150*a*-1 of the VCM encoder 150*a* may selectively input one or more feature maps from the feature map P9 to the feature map P12 as needed. In the example of FIG. 14B, it is shown that the MSFF performing part 150*a*-1 of the VCM encoder 150*a* optionally receives feature map P9, feature map P10, and feature map P12 among the feature maps P9 to P12.

The MSFR performer 150*b*-1 of the VCM decoder 150*b* may restructure the feature map P9' to the feature map P12' from the output F' from the SSFC decoder 150*b*-2. The MSFR performer 150*b*-1 of the VCM decoder 150*b* may then pass at least one of the restored feature map P9' to the feature map P12' to each task.

Figure 15A:
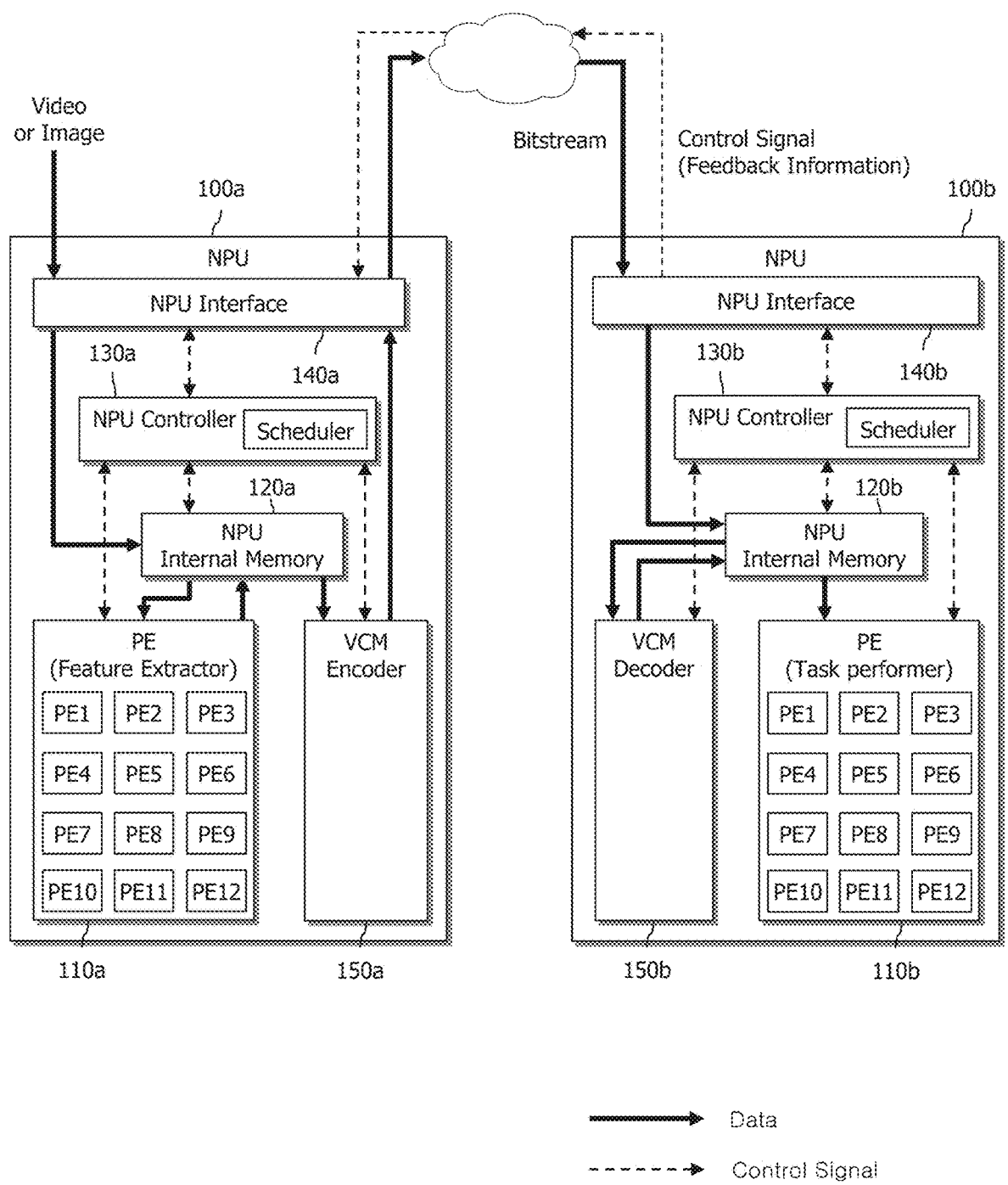
FIG. 15A is an exemplary diagram illustrating an NPU according to the present disclosure from an operational perspective.

FIG. 15A is an exemplary diagram illustrating an NPU according to the present disclosure from an operational perspective.

As can be seen with reference to FIG. 15A, the first NPU 100*a* on the transmission side may include a plurality of first PEs 110*a*, a first NPU internal memory 120*a*, a first NPU controller 130*a*, a first NPU interface 140*a*, and a VCM encoder 150*a*.

The VCM encoder 150a may include an MSFF performer 150a-1, an SSFC encoder 150a-2, and a compressor 150a-3, as shown in FIG. 11, FIG. 12, or FIG. 14B.

The second NPU 100b on the receiver side may include a plurality of second PEs 110b, a second NPU internal memory 120b, a second NPU controller 130b, a second NPU interface 140b, and a VCM decoder 150b.

The VCM decoder 150b may include an SSFC decoder 150b-1, an MSFR performer 150b-2, and a decompressor 150b-3, as shown in FIG. 11, FIG. 12, or FIG. 14B.

The bold lines in the illustration represent the flow of data (e.g., video/images, feature maps, or bitstreams), while the dotted lines represent the flow of control signals.

First, when the video/image is received by the first NPU 100a on the transmission side, the first NPU controller 130a in the first NPU 100a stores it in the first NPU internal memory 120a via the first NPU interface 140a.

Then, the first NPU controller 130a in the first NPU 100a causes the plurality of first PEs 110a to read the video/image from the first NPU internal memory 120a and perform operations on the ANN model layer by layer.

In accordance with the control signal from the first NPU controller 130a, the plurality of first PEs 110a store the feature maps that are output as a result of performing layer-by-layer operations of the ANN model in the first NPU internal memory 120a. As the feature maps of the layers of the ANN model are stored respectively, a plurality of feature maps may be stored in the first NPU internal memory 120a.

In response to a control signal from the first NPU controller 130a, the VCM encoder 150a may select one or more feature maps from among the plurality of feature maps stored in the first NPU internal memory 120a as a candidate to be transmitted.

The selected one or more feature maps are then converted into a bitstream as shown in FIG. 11, FIG. 12, or FIG. 14B by passing through the SSFC decoder 150b-1 and the MSFR performer 150b-2 and the decompressor 150b-3 within the VCM encoder 150a.

Thereafter, the VCM encoder 150a transmits the bitstream through the first NPU interface 140a in response to a control signal from the first NPU controller 130a.

Meanwhile, when the second NPU 100b on the receiver side receives the bitstream, the second NPU controller 130b in the second NPU 100b stores it in the second NPU internal memory 120b via the second NPU interface 140b.

A VCM decoder 150b in the second NPU 100b of the receiver side reads the bitstream from the second NPU internal memory 120b under the control of the second NPU controller 130b.

The received bitstream is restored to one or more feature maps as shown in FIG. 11, FIG. 12, or FIG. 14B after passing through the SSFC decoder 150b-1 and the MSFR performer 150b-2 and the decompressor 150b-3 within the VCM decoder 150b.

Then, the VCM decoder 150b stores the restored one or more feature maps in the second NPU internal memory 120b.

The second NPU controller 130b in the second NPU 100b causes the plurality of second PEs 110b to read the reconstructed one or more feature maps from the second NPU internal memory 120b, and then perform layer-by-layer operations on the ANN model.

If there are multiple machine tasks, as shown in FIG. 14B, there may also be multiple ANN models.

Figure 15B:
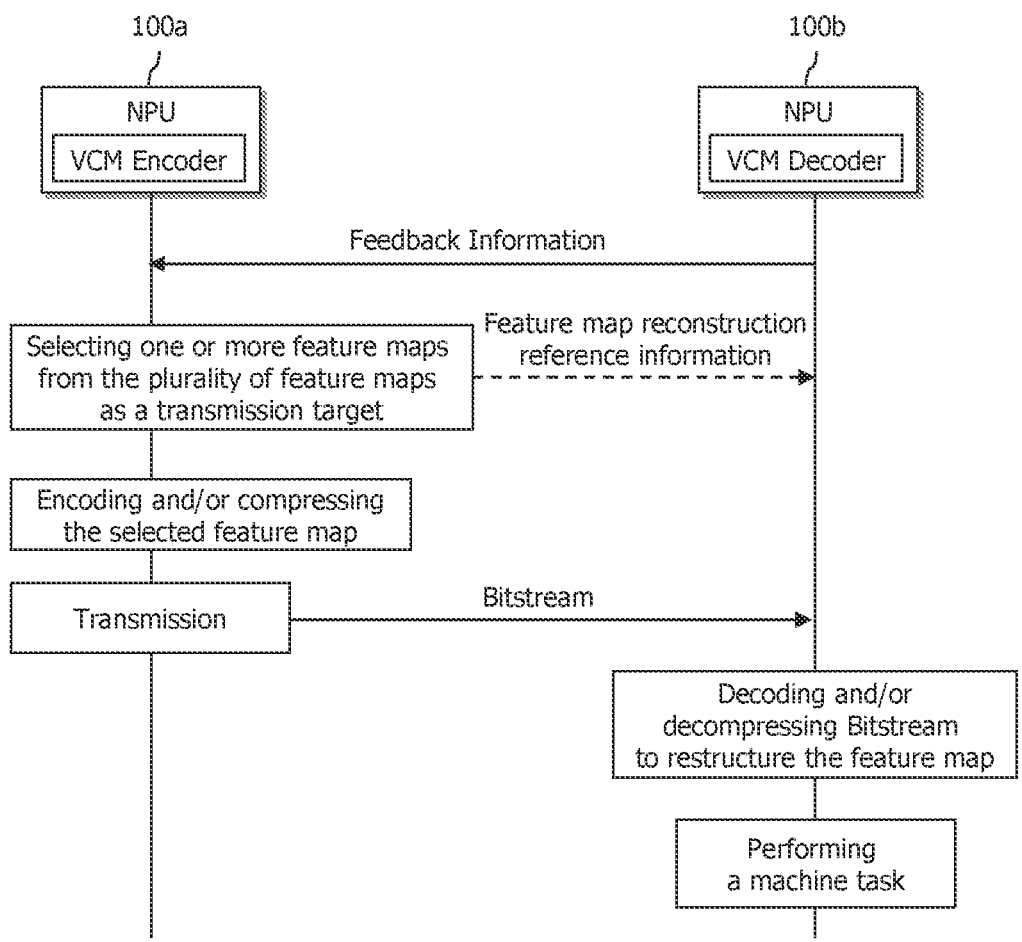
FIG. 15B is a flow diagram illustrating signal flow between a transmitter-side NPU and a receiver-side NPU.

FIG. 15B is a flow diagram illustrating signal flow between a transmitter-side NPU and a receiver-side NPU.

Referring to FIG. 15B, a transmission side NPU 100a and a receiver side NPU 100b are shown.

The receiver side NPU 100b may transmit feedback information to the transmission side NPU 100a. The feedback information may be information that allows the transmitter NPU 100a to select one or more feature maps for transmission. For example, the feedback information may include information about a machine task used by the receiving NPU 100b and a corresponding ANN model. Alternatively, the feedback information may include identifying information for one or more layers of the plurality of layers in the corresponding ANN model. Alternatively, the feedback information may include identifying information for one or more of the plurality of feature maps generated by the transmitter NPU 100a that are the subject of the transmission.

Then, based on the feedback information, the transmission side NPU 100a may select one or more feature maps from the plurality of feature maps as a transmission target. The feature map reconstruction reference information including information about the selected one or more feature maps may be transmitted to the receiver NPU 100b. The feature map reconstruction reference information may include identification information for one or more layers of the plurality of layers to which the selected one or more feature maps belong. Further, the feature map reconstruction reference information may include identification information for the one or more feature maps to be transmitted among the plurality of feature maps generated by the transmitter NPU 100a.

Then, the transmission side NPU 100a may encode and/or compress the selected feature map and transmit it in the form of a bitstream.

After receiving the bitstream, the receiver side NPU 100b may perform decoding and/or decompression to restructure the feature map. At this time, the feature map reconstruction reference information may be used.

The receiver side NPU 100b may then utilize the restored feature map to perform computation of subsequent layers of the ANN model, thereby performing a machine task.

Figure 15C:
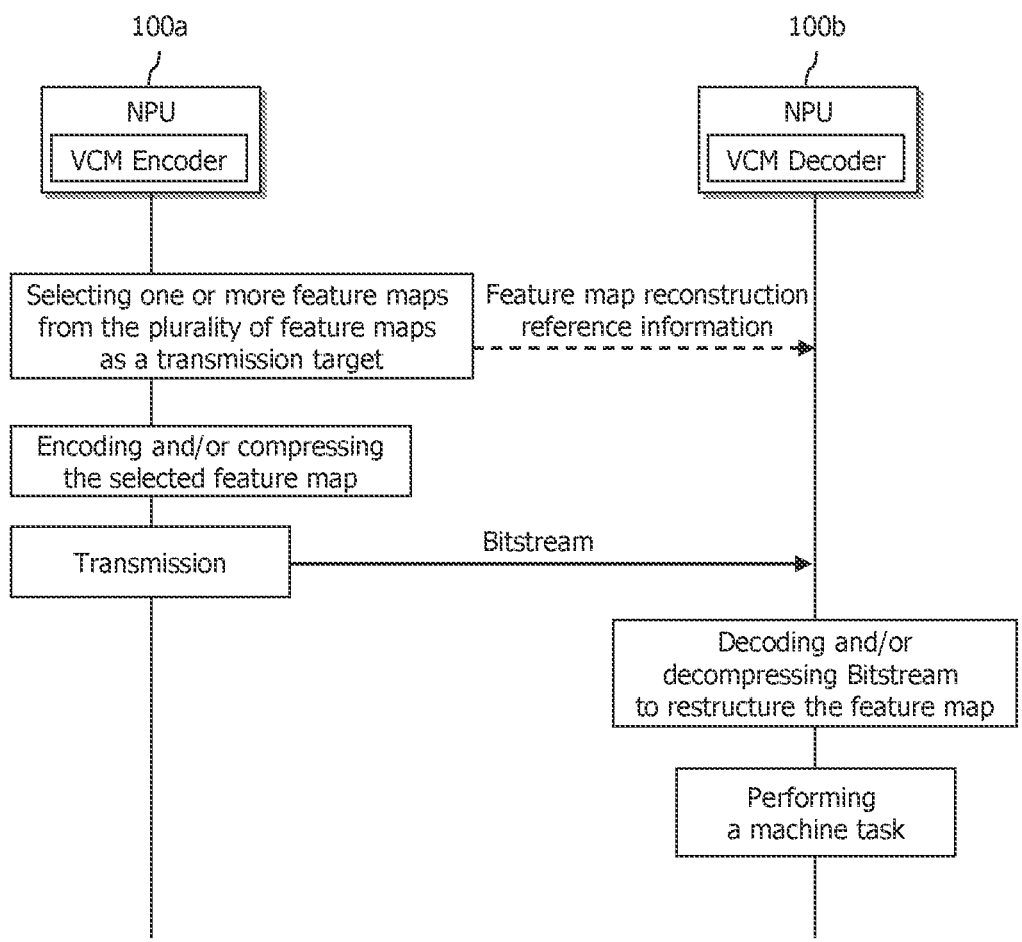
FIG. 15C is a modified example of FIG. 15B.

FIG. 15C is a modified example of FIG. 15B.

Referring to FIG. 15C, a transmission side NPU 100a and a receiver side NPU 100b are shown.

The transmission side NPU 100a may select one or more feature maps from the plurality of feature maps as a transmission destination. A feature map restoration reference information including information about the selected one or more feature maps may be transmitted to the receiver side NPU 100b.

Then, the transmission side NPU 100a may encode and/or compress the selected feature map and transmit it in the form of a bitstream.

After receiving the bitstream, the receiver side NPU 100b may perform decoding and/or decompression to restructure the feature map.

The receiver side NPU 100b may then utilize the restored feature map to perform computation of subsequent layers of the ANN model to perform a machine task.

The feature map reconstruction reference information may include identification information for one or more layers of the plurality of layers to which the selected one or more feature maps belong. Further, the feature map reconstruction reference information may include identification information for the one or more feature maps to be transmitted among the plurality of feature maps generated by the transmission side NPU 100a.

Figure 15D:
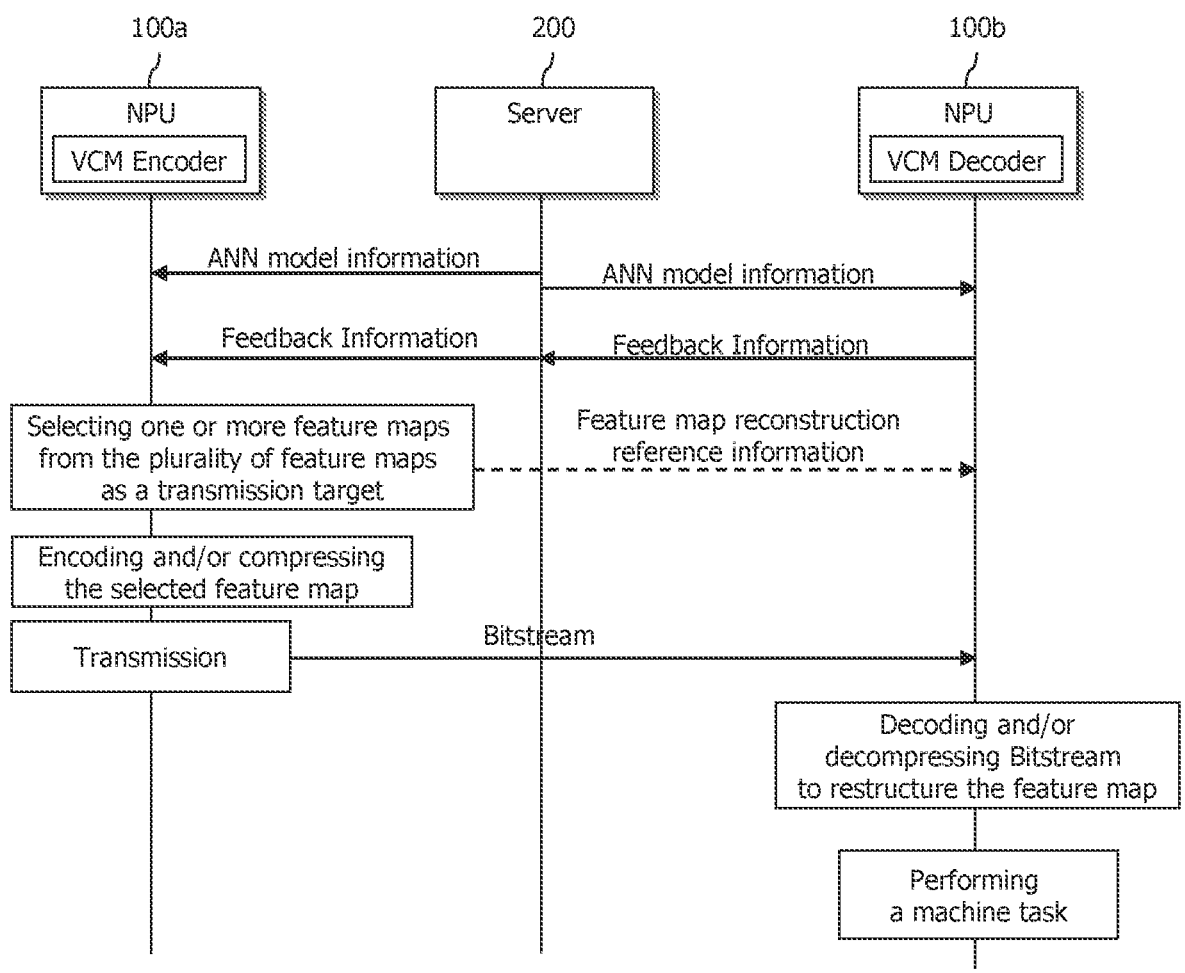
FIG. 15D is another modified example of FIG. 15B.

FIG. 15D is another modified example of FIG. 15B.

Referring to FIG. 15D, a transmission side NPU 100a, a receiver side NPU 100b, and a server 200 are shown.

First, the server 200 may transmit information about the ANN model to be used by the receiver side NPU 100b to both or either of the transmission side NPU 100a and the receiver side NPU 100b.

The receiver side NPU 100b may transmit feedback information. The feedback information may be information that enables the transmission side NPU 100a to select the one or more feature maps for transmission. For example, the feedback information may include identifying information for one or more layers of the plurality of layers in the ANN model. Alternatively, the feedback information may include identifying information for one or more feature maps to be transmitted out of a plurality of feature maps generated by the transmission side NPU 100a.

Then, based on the feedback information, the transmission side NPU 100a may select one or more feature maps from the plurality of feature maps as a transmission object. The feature map reconstruction reference information including information about the selected one or more feature maps may be transmitted to the receiver side NPU 100b. The feature map reconstruction reference information may include identification information for one or more layers of the plurality of layers to which the selected one or more feature maps belong. Further, the feature map reconstruction reference information may include identification information for the one or more feature maps to be transmitted among the plurality of feature maps generated by the transmission side NPU 100a.

Then, the transmission side NPU 100a may encode and/or compress the selected feature map and transmit it in the form of a bitstream.

After receiving the bitstream, the receiver side NPU 100b may perform decoding and/or decompression to restore the feature map. At this time, the feature map reconstruction reference information may be used.

The receiver side NPU 100b may then utilize the restored feature map to perform computation of subsequent layers of the ANN model, thereby performing a machine task.

Figure 16:
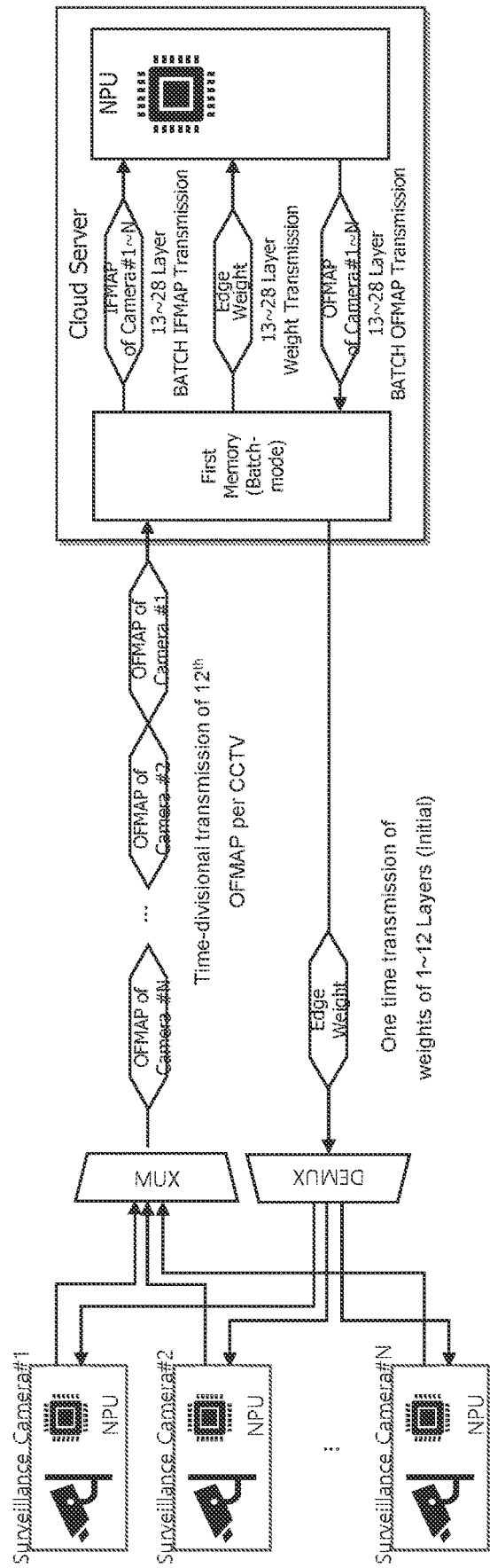
FIG. 16 is an illustrative diagram depicting an exemplary first scenario in which one example of the present disclosure is applied.

FIG. 16 is an illustrative diagram depicting an exemplary first scenario in which one example of the present disclosure is applied.

As can be seen with reference to FIG. 16, a surveillance camera may be equipped with an edge NPU. The edge NPU may be a low power specialized NPU. The camera may include an SoC including a lens, an image sensor, an ISP, and the like. The SoC may comprise or be configured to communicate with the edge NPU.

Said NPU can extract a feature map from the captured image. In general, the size of the feature map is very large, resulting in a significant amount of network bandwidth required to transmit it wired or wirelessly, causing network congestion and power consumption.

Thus, according to one example of the present disclosure, the NPU equipped with the surveillance camera may select and transmit a smaller output feature map among the layers in the artificial neural network model. Before transmitting the output feature map, the NPU mounted on the surveillance camera may further reduce the size via a multi-scale feature fusion (MSFF) performer and a single-stream feature codec (SSFC) encoder, as illustrated in FIG. 11A.

In this way, if each surveillance camera selects a particular layer with a small data size, such as the 12th layer, and transmits the output feature map of the 12th layer, the use of weights of about 4 megabytes per one cycle of inference operations can be avoided.

TABLE 1

| Mobilenet V1 | | | | |
|---|---|---|---|---|
| | Layer | Sum of weights | MAX IFMAP + OFMAP | MAC calculation |
| EDGE NPU | 1~12 | 133,568 (Kbyte) | 1,204,224 (Kbyte) | 202,861,568 |
| SERVER NPU | 13~28 | 4,075,520 (Kbyte) | 200,704 (Kbyte) | 365,878,784 |

Accordingly, the NPU provided in the surveillance camera may not need to process all layers of the artificial neural network, thereby simplifying its complexity. For example, the NPU provided in the surveillance camera may include fewer PEs because it only needs to process up to a particular layer among all the layers of an artificial neural network. Further, the NPU in the surveillance camera may include a smaller size of SRAM. Further, the NPU in the camera may not include dynamic random-access memory (DRAM). By doing so, the NPU to be equipped with the surveillance camera may significantly reduce the cost of manufacturing. Furthermore, the NPU to be equipped with the surveillance camera may significantly reduce power consumption.

In other words, the system can be configured to consider the performance of the NPU at the edge and process only as many layers as the NPU at the edge can process in real time, and send the next layer to the cloud server.

For example, if the NPU at the edge needs to process inference at a minimum of 30 frames per second (FPS), the NPU at the edge might be set to only process up to the layer that can achieve the target FPS. The minimum FPS can be calculated based on the amount of MAC computation up to a particular layer.

For example, if the internal memory for the weights of the NPU at the edge is limited to 150 Kb, the NPU at the edge may be set to process only up to the 12th layer, knowing that the sum of the weights from the first layer to the 12th layer is 133 Kb.

Each surveillance camera can select a particular layer with a small data size and send the output feature map of that particular layer.

In this way, the output feature maps from multiple surveillance cameras can be time-division multiplexed by a multiplexer (MUX) and sent to the cloud server.

The cloud server may include a first memory, and an NPU.

The first memory of the cloud server may be time-division multiplexed to temporarily store a plurality of incoming output feature maps. Further, the first memory of the cloud server may store weights to be used in subsequent layers that are not processed by the NPU of the surveillance camera. As can be seen with reference to FIGS. 12 and 13, the cumulative size of the weights from the 13th layer to the 28th layer may be 4075 Kb. As such, the accumulated size of the weights of the 13th layer to the 28th layer is not significantly small, but when the number of surveillance cameras increases, the reuse rate of the weights according to the batch-mode increases, so the efficiency does not decrease. In the batch-mode, if the artificial neural network model used by multiple surveillance cameras is the same, the weight of each layer of the artificial neural network model can be the same. Therefore, the NPU of the cloud server can use the same weight to process multiple feature maps transmitted from multiple surveillance cameras. Thus, the same weight can be reused, and as the number of cameras increases, the reuse rate of the weight can increase.

A memory controller controlling the first memory may manage memory addresses such that the plurality of output feature maps may be read sequentially from the first memory.

Under the control of this memory controller, this first memory sequentially passes the plurality of output feature maps to the NPU.

The NPU of the cloud server utilizes the output feature map of the 12th layer from each camera read from the first memory as the input feature maps of the 13th layer. The NPU of the cloud server then performs an artificial neural network operation using the weight read from the first memory.

On the other hand, since the size of the output feature map and the input feature map written to or read from the first memory while the NPU of the cloud server processes the 13th layer to the 28th layer is not very large (only 200 Kb per surveillance camera), as can be seen with reference to FIGS. 12 and 13, the cloud server can process the computation of the artificial neural network for a large number of cameras.

Figure 17:
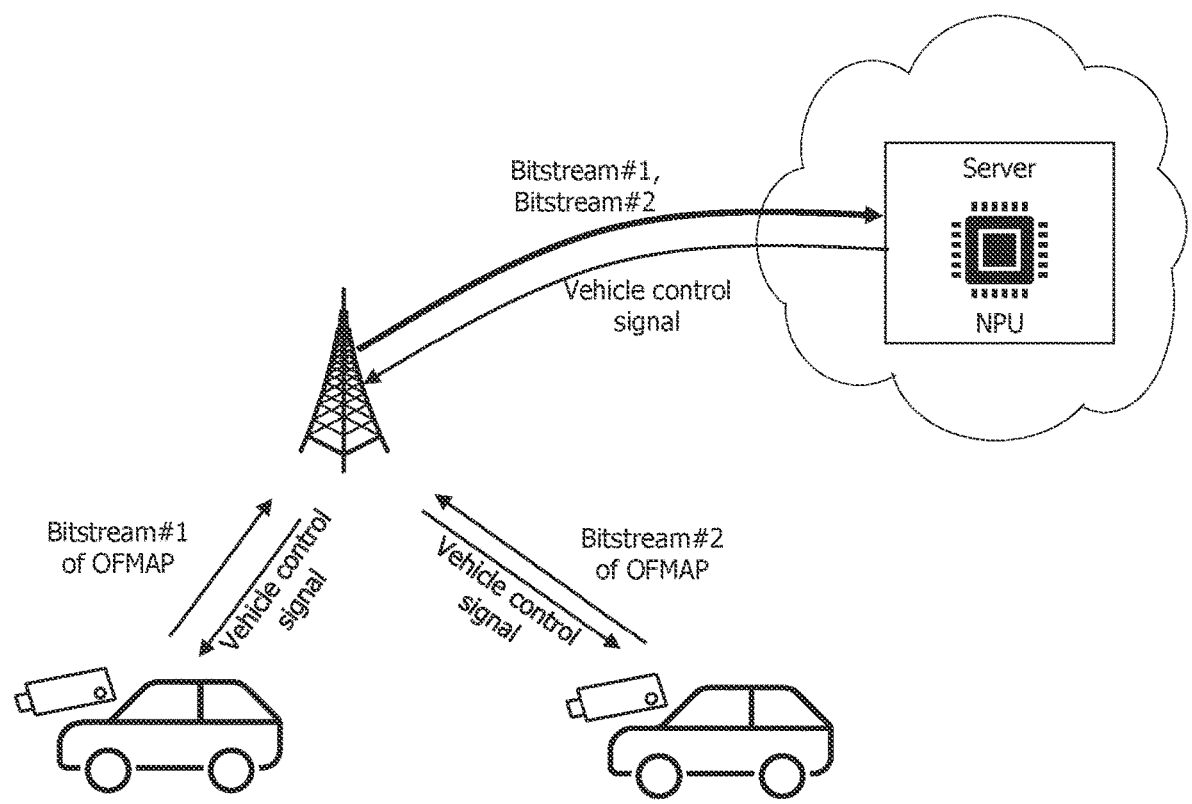
FIG. 17 is an illustrative diagram of an exemplary second scenario to which one example of the present disclosure applies.

FIG. 17 is an illustrative diagram of an exemplary second scenario to which one example of the present disclosure applies.

The vehicle camera illustrated in FIG. 17 may include an edge NPU. The NPU mounted on the vehicle camera may select and transmit a smaller output feature map among the layers in the artificial neural network model as described above. Prior to transmitting the output feature map, the NPU mounted on the surveillance camera may further reduce the size via a multi-scale feature fusion (MSFF) performer and a single-stream feature codec (SSFC) encoder, as illustrated in FIG. 11A.

The cloud server may include an NPU for the server. The NPU of the cloud server may perform a computation utilizing the output feature maps from the respective vehicle cameras as input feature maps. The NPU of the cloud server may generate a vehicle control signal as a result of the computation and transmit it to each vehicle.

The rest of the details are identical to those described above, so redundant descriptions will be omitted.

Figure 18:
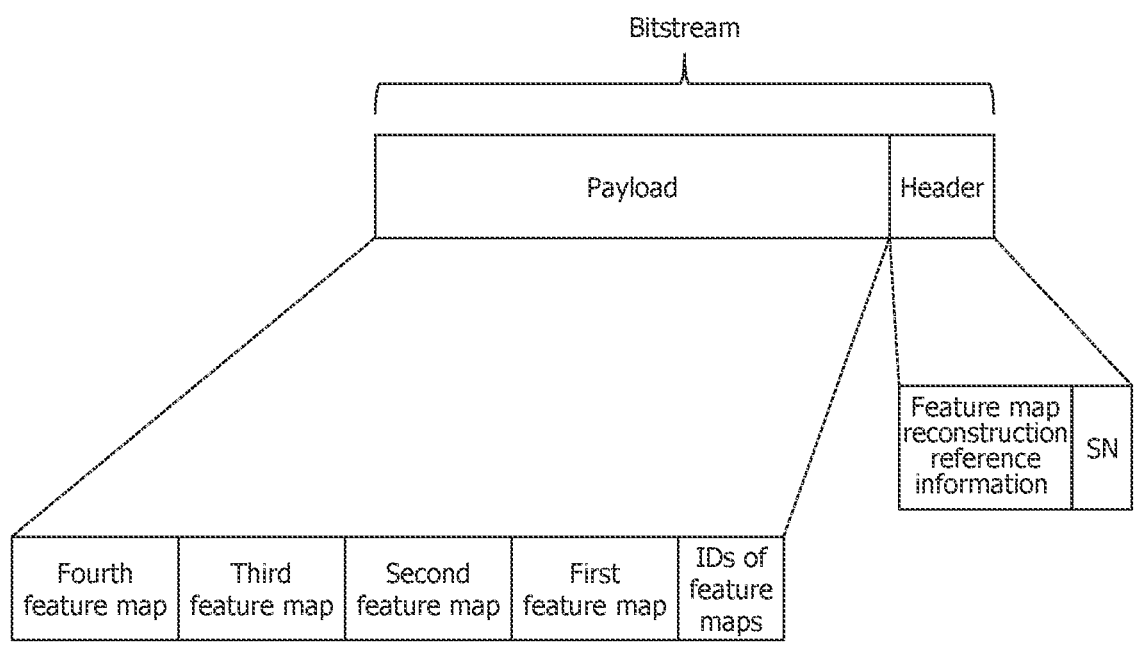
FIG. 18 is an illustrative diagram of an exemplary bitstream according to one example of the present disclosure.

FIG. 18 is an illustrative diagram of an exemplary bitstream according to one example of the present disclosure.

As can be seen with reference to FIG. 18, a bitstream according to one example of the present disclosure may be divided into a header and a payload. The header may include a serial number (SN) of the bitstream and a feature map restore reference.

The payload may include a list of identifiers (IDs) of the feature maps included. Further, the payload may include a plurality of feature maps identified by the list of identifiers.

In such cases where a plurality of feature maps are included in the payload, the list of identifiers may be represented as a bitmap.

For example, if each identifier is represented by 3 bits and the payload includes 4 feature maps, the bitmap may be represented by 12 bits (=3 bits*4).

In another example, if each identifier is represented by 6 bits and the payload includes 4 feature maps, the bitmap may be represented by 24 bits (=6 bits*4). When a plurality of feature maps output from multiple surveillance cameras are multiplexed and transmitted, as in the example shown in FIG. 16, the identifiers in the payload may be generated by combining the identifiers of the surveillance cameras and the identifiers of the feature maps. For example, if the identifier of the surveillance camera is 2 bits and the identifier of the feature map is 4 bits, the identifier in the payload may have a length of 2 bits+4 bits=6 bits.

The examples of the present disclosure shown in the present disclosure and in the drawings are provided by way of illustration only to facilitate the description and understanding of the present disclosure and are not intended to limit the scope of the present disclosure. It will be apparent to one of ordinary skill in the art to which this disclosure pertains that other modifications are possible in addition to the examples described above.

Summary of Examples Presented in the Specification

According to an example of the present disclosure, a neural processing unit (NPU) capable of encoding is provided. The NPU may comprise one or more processing elements (PEs) to perform operations for a plurality of layers of an artificial neural network and to generate a plurality of output feature maps; and an encoder to encode at least one particular output feature map among a plurality of output feature maps into a bitstream and to transmit thereof.

The encoder may select the at least one particular output feature maps from among the plurality of output feature maps based on particular information.

The particular information may be received from a server or another NPU that receives the bitstream.

The particular information may include identification information of the at least one particular output feature map or identification information of a layer corresponding to the particular output feature map.

The particular information may be generated based on information on a size of the output feature map, information on a machine task performed on another NPU receiving the bitstream, or information on an artificial neural network model to be processed on the another NPU receiving the bitstream.

The bitstream may be transmitted to enable another NPU to perform calculations for subsequent layers of the artificial neural network.

The bitstream may include an identifier of the particular output feature map. In addition, the bitstream may be divided into a header and a payload.

According to an example of the present disclosure, a neural processing unit (NPU) capable of decoding is provided. The NPU may comprise a decoder to receive a bitstream and reconstruct the bitstream into at least one particular feature map for decoding; and one or more processing elements (PEs) to perform operations of an artificial neural network model. The at least one particular feature map for decoding may be a particular output feature map of a particular layer among a plurality of layers of the artificial neural network. The one or more PEs may utilize the at least one particular feature map that is reconstructed into an input feature map of a subsequent layer of the particular layer.

The NPU may transmit particular information to allow the particular layer or the at least one feature map to be selected by another NPU transmitting the bitstream.

The particular information may include identification information of the at least one particular output feature map or identification information of a layer corresponding to the particular output feature map.

The particular information may be generated based on information on a size of the output feature map, information on a machine task to be performed on the NPU, or information on the artificial neural network model.

The bitstream may include an identifier of the particular output feature map. In addition, the bitstream may be divided into a header and a payload.

According to an example of the present disclosure, a system is provided. The system may comprise a first neural processing unit configured to process a first layer section of an artificial neural network model where the artificial neural network model includes a plurality of layers; and a second neural processing unit configured to process a second layer section of the artificial neural network model. The first neural processing unit may be configured to input an output feature map of a last layer of the first layer section to the second neural processing unit.

A total weight size of layers in the first layer section may be relatively smaller than a total weight size of layers in the second layer section.

The first neural processing unit may be plural, and the second neural processing unit may be configured to sequentially process each of the output feature map outputted from the first neural processing unit.

The second neural processing unit may be configured to reuse a weight corresponding to at least a number of the first neural processing unit.

A size of a first memory of the first neural processing unit may be configured to be relatively smaller than a size of a second memory of the second neural processing unit.

The first layer section and the second layer section of the artificial neural network model may be determined based on a size of an output feature map of a particular layer.

The first layer section and the second layer section of the artificial neural network model may be determined based on a size of a sum of weights of the first layer section and the second layer section, respectively.

A size of a first weight of the first layer section of the artificial neural network model may be relatively smaller than a size of a second weight of the second layer section.

The claims of the present disclosure can be combined in various ways. For example, the technical features of the method claim of this disclosure may be combined and implemented as a device, and the technical features of the device claims of this disclosure may be combined and implemented as a method. Further, the technical features of the method claim of this disclosure may be combined with the technical features of the apparatus claims to form a device, and the technical features of the method claims of this disclosure may be combined with the technical features of the apparatus claims to form a method.

[Task Reference Year]: 2023
[Task Identification Number]: 1711193211
[Detail Task Number]: 2022-0-00957-002
[Name of Ministry] Ministry of Science and ICT
[Director of Research]: KIM, Lokwon
[Name of Organization Performing the Task] DeepX Co., Ltd.
[Name of Project Management (Specialized) Institution] Institute of Information & Communications Technology Planning & Evaluation
[Research period] 2023 Jan. 1~2023 Dec. 31
[Research Task Title] PIM semiconductor technology development for distributed edge devices to converge an on-chip memory and a calculator

The invention claimed is:

1. A neural processing unit (NPU) capable of encoding, the NPU comprising:
at least one processing element (PE) to perform operations for a plurality of layers of an artificial neural network and to generate a plurality of output feature maps; and
an encoder to encode at least one particular output feature map into a bitstream,
wherein the at least one particular output feature map is selectively encoded among the plurality of output feature maps,
wherein the at least one particular output feature map is selected based on at least one of a size and a kind of machine analysis task, and
wherein the at least one particular output feature map and reference information for reconstructing the at least one particular output feature map are transmitted via the bitstream.

2. The NPU of claim 1,
wherein the at least one particular output feature map is selected from the plurality of output feature maps based on particular information.

3. The NPU of claim 2,
wherein the particular information is received from a server or another NPU that receives the bitstream.

4. The NPU of claim 2,
wherein the particular information includes identification information of the at least one particular output feature map or identification information of a layer corresponding to the at least one particular output feature map.

5. The NPU of claim 2,
wherein the particular information is generated based on information on a size of the at least one particular output feature map, information on a machine task performed on another NPU receiving the bitstream, or information on an artificial neural network model to be processed on the another NPU receiving the bitstream.

6. The NPU of claim 1,
wherein the bitstream is transmitted to enable another NPU to perform calculations for subsequent layers of the artificial neural network.

7. The NPU of claim 1,
wherein the bitstream is divided into a header and a payload, and
wherein the header includes the reference information, and the payload includes the at least one particular output feature map.

8. A neural processing unit (NPU) capable of decoding, the NPU comprising:
a decoder to receive a bitstream and to reconstruct the bitstream into at least one feature map for decoding; and
at least one processing element (PE) to perform operations of an artificial neural network model,
wherein the bitstream includes the at least one feature map and reference information for reconstructing the at least one feature map,
wherein the at least one feature map for decoding relates to a particular output feature map of a particular layer among a plurality of layers of the artificial neural network model,
wherein the particular output feature map is selectively encoded among a plurality of output feature maps with respect to the particular layer,
wherein the particular output feature map is selected based on at least one of a size and a kind of machine analysis task, and wherein the at least one PE utilizes the at least one feature map for decoding into an input feature map of a subsequent layer of the particular layer.

9. The NPU of claim 8,
wherein the NPU transmits particular information which allows the particular layer or the particular output feature map to be selected by another NPU transmitting the bitstream.

10. The NPU of claim 9,
wherein the particular information includes identification information of the particular output feature map or identification information of a layer corresponding to the particular output feature map.

11. The NPU of claim 9,
wherein the particular information is generated based on information on a size of the particular output feature map, information on a machine task to be performed on the NPU, or information on the artificial neural network model.

12. The NPU of claim 8,
wherein the bitstream is divided into a header and a payload, and
wherein the header includes the reference information, and the payload includes the at least one feature map.

13. A system comprising:
a first electric device including a first semiconductor for a first neural processing unit, the first semiconductor being configured to process a first layer section of an artificial neural network model, the artificial neural network model comprising a plurality of layers; and
a second electric device including a second semiconductor for a second neural processing unit, the second semiconductor being configured to process a second layer section of the artificial neural network model,
wherein the first electric device is configured to encode a particular output feature map of a last layer of the first layer section and transmit the particular output feature map and reference information for reconstructing the particular output feature map to the second electric device,
wherein the particular output feature map is selectively encoded among a plurality of output feature maps with respect to the last layer of the first layer section, and
wherein the particular output feature map is selected based on at least one of a size and a kind of machine analysis task.

14. The system of claim 13,
wherein a total weight size of layers in the first layer section is relatively smaller than a total weight size of layers in the second layer section.

15. The system of claim 13,
wherein the first neural processing unit is plural, and
wherein the second semiconductor is configured to sequentially process each of output feature maps outputted from the first neural processing unit.

16. The system of claim 13,
wherein the second semiconductor is configured to reuse a weight corresponding to at least a number of the first neural processing unit.

17. The system of claim 13,
wherein a size of a first memory of the first neural processing unit is relatively smaller than a size of a second memory of the second neural processing unit.

18. The system of claim 13,
wherein the first layer section and the second layer section of the artificial neural network model are determined based on a size of an output feature map of a particular layer.

19. The system of claim 13,
wherein the first layer section and the second layer section of the artificial neural network model are determined based on a size of a sum of weights of the first layer section and the second layer section, respectively.

20. The system of claim 13,
wherein a size of a first weight of the first layer section of the artificial neural network model is relatively smaller than a size of a second weight of the second layer section.

* * * * *